United States Patent
Zhang

(10) Patent No.: US 7,305,577 B2
(45) Date of Patent: Dec. 4, 2007

(54) DATA ISOLATION SYSTEM AND METHOD

(75) Inventor: Xingming Zhang, Yang Zhou (CN)

(73) Assignee: Star Softcomm Pte Ltd, Singapore (SG)

( * ) Notice: Subject to any disclaimer, the term of this patent is extended or adjusted under 35 U.S.C. 154(b) by 171 days.

(21) Appl. No.: 10/552,925

(22) PCT Filed: Apr. 5, 2004

(86) PCT No.: PCT/SG2004/000082

§ 371 (c)(1),
(2), (4) Date: Oct. 11, 2005

(87) PCT Pub. No.: WO2004/090722

PCT Pub. Date: Oct. 21, 2004

(65) Prior Publication Data

US 2006/0253724 A1   Nov. 9, 2006

(30) Foreign Application Priority Data

Apr. 11, 2003   (SG) ................................ 200302158

(51) Int. Cl.
*G06F 11/00* (2006.01)
(52) U.S. Cl. .......................................... 714/6; 711/162
(58) Field of Classification Search ................ 711/162; 714/6, 19; 713/165, 193
See application file for complete search history.

(56) References Cited

U.S. PATENT DOCUMENTS

| | | | |
|---|---|---|---|
| 6,718,466 B1 | 4/2004 | Duwe et al. | |
| 6,728,751 B1* | 4/2004 | Cato et al. | 709/202 |
| 6,845,464 B2 | 1/2005 | Gold | |
| 6,901,493 B1* | 5/2005 | Maffezzoni | 711/162 |
| 2002/0169877 A1* | 11/2002 | Bantz et al. | 709/226 |
| 2003/0009752 A1* | 1/2003 | Gupta | 717/171 |
| 2003/0229768 A1 | 12/2003 | Kawano et al. | |
| 2004/0133790 A1* | 7/2004 | Hensley | 713/191 |
| 2005/0015652 A1* | 1/2005 | Han et al. | 714/6 |
| 2005/0081004 A1* | 4/2005 | Zhang | 711/162 |

FOREIGN PATENT DOCUMENTS

CN       1419196        5/2003

(Continued)

OTHER PUBLICATIONS

Microsoft Press Computer Dictionary, 1997, Microsoft Press, Third Edition, p. 13.*

*Primary Examiner*—Marc Duncan
(74) *Attorney, Agent, or Firm*—Christie, Parker & Hale, LLP.

(57) ABSTRACT

A data isolation system for software and data maintenance, back up and recovery for a computer wherein dynamic data files are identified and redirected or copied into a hidden partition (212) on a hard disk (210) of the computer. Automatic back ups are made to the dynamic data files in the hidden partition (212) whenever the dynamic data files are amended. The dynamic data files in the hidden partition (212) include the computer's operating environment so that the computer's operating environment can be restored from the dynamic data files in the hidden partition (212). The dynamic data files in the hidden partition (212) include data up to the time of a failure of the computer's system.

52 Claims, 23 Drawing Sheets

FOREIGN PATENT DOCUMENTS

| | | |
|---|---|---|
| EP | 1 067 460 B1 | 12/2001 |
| EP | 1 195 679 A1 | 4/2002 |
| JP | 2000-305857 | 11/2000 |
| JP | 2004-013563 | 1/2004 |
| WO | WO 03/042840 A1 | 5/2003 |

\* cited by examiner

DATA ISOLATION SYSTEM AND METHOD

FIELD OF INVENTION

The present invention relates to data isolation system and method and refers particularly, though not exclusively, to a data isolation system and method for at least one of software and data: maintenance, back up, recovery, security and privacy control, within a computer system or network.

BACKGROUND TO THE INVENTION

With the great advances in semiconductor technologies over the last thirty years, computer hardware reliability has increased significantly. Software installed and used on the computer causes more, than 80% of computer problems.

Many computer users are not sufficiently technically trained to handle a system failure. They often need to contact a call center for assistance. This is a time consuming and costly way of supporting computer systems, as the technical support staff at the call center cannot see the problem. Furthermore, many users do not have a full or complete back up regime and therefore are not always able to restore their computer system to full operational capability.

There are a number of remote management software applications available. They enable an authorized remote computer user to logon to the host computer. The remote computer user will have the full control of, and access rights to, the host computer as if operating at the host computer location. Remote software applications are good for many applications such as distant working. A user can access their company computer system from a home computer system over the Internet. However, such remote software is not suitable for remote technical support for the system or software. The computer user should not be required to allow access to their sensitive or private data files to unknown third party maintenance staff.

Problems relating to the reliability of software installed on a computer may be classified as being due to:

1) installation and use of unstable software that leads to a system failure;
2) installation and use of an unsuitable device driver that leads to a system failure;
3) unintentional deletion of important system files that leads to a system failure;
4) installation and use of software that conflicts with a system dynamic link library;
5) attacks by computer viruses or hackers that lead to system instability and failure;
6) excessive software installations that lead to a large number of system files. This may cause system instability, and slow processing; and
7) installation and use of various service providers that leads to system instability and failure.

It is often difficult and time consuming to identify the cause of any of the above problems. Frequently, a skilled technician is required to handle these issues, which is costly for most small and medium sized companies. Furthermore, some data may be permanently lost during a system failure leading to financial loss to the company.

However, it is possible to identify the condition of the computer system-operating environment as being in a normal or unstable state. If it is possible to maintain and backup the entire system environment when it is in a normal working condition, it will be possible to resolve the unstable system condition by restoring the normal working system environment after detection, prior to, or after system failure. A normal working operating environment can then resumed.

There are many software maintenance, back up and recovery solutions available. In general, these solutions differ by using various methods to restore the system environment. However, none are capable of restoring dynamic data files, especially those containing user data that was modified between the last back up and the system failure. Some data loss is inevitable with known products. Such data loss may cause significant difficulties to the computer user. For example, an address book, stored email messages, and so forth may be permanently lost. This issue becomes more significant when the user does not back up or save their data files on a regular basis.

SUMMARY OF THE INVENTION

In one aspect of the present invention there is provided a data isolation system for software and data maintenance, back up and recovery for a computer wherein dynamic data files are identified and passed into a hidden partition on a hard disk of the computer, the passing being by one or more selected from the group consisting of: copying and redirection; and preferably access control and filtering.

Automatic back ups may be made to the dynamic data files in the hidden partition whenever the dynamic data files are accessed and modified. The dynamic data files may include the computer's operating environment so that the computers operating environment can be restored from the dynamic data files in the hidden partition. The dynamic data files in the hidden partition may include data up to the time of a failure of the computers system.

Compression may be used for at least one file of the dynamic data files in the hidden partition, and encryption may be used for at least one of the dynamic data files in the hidden partition.

The hidden partition and its content may be neither manageable nor accessible by the computer's operating system. The dynamic data files in the hidden partition may not be accessible by any software application on the computer. Prior to copying the dynamic data files into the hidden partition, all software installed on the computer, including an operating system for the computer, may be segregated into at least one static routine and the dynamic data files, dynamic data files including system configuration files, and user data files. The segregation may comprise categorization.

All data sent from the operating system to the dynamic data files and all data sent from the dynamic data files to the operating system may be passed to the dynamic data files in the hidden partition. The dynamic data files in the hidden partition may be continuously updated.

On system recovery, a last back up system environment in the hidden partition, with the copied dynamic data files, may be recovered. The dynamic data files in the hidden partition may include all data up to an instant before the recovery process was invoked, and the system environment may include the operating system and software.

Upon new software being installed in the computer, the installation may be delayed until a back up of the existing system environment to the hidden partition is completed and, after completion of the back up, the installation is resumed. If system instability or failure is encountered after the installation or running of the new application, the computer system may restore the previous operating environment from the back up.

Upon a new device driver being installed in the computer, the installation may be delayed until a back up of the existing system environment to the hidden partition is completed and, after completion of the back up, the installation is resumed and, if system instability or failure is encountered after the installation or running of the new device driver, the computer system may restore the previous operating environment from the back up.

The software application and its dynamic data files may be copied to the hidden partition as independent modules. The dynamic data files in the hidden partition may work as active data files for a software application and may be continuously updated.

The segregating or categorizing of the dynamic data files of may be by use of a data isolation technique that consists of one or more of:
  (a) automatic selection of a commonly used software application of the primary operating system;
  (b) automatic selection of a commonly used software application;
  (c) selection of a software application by a user of the computer; and
  (d) selection of files or file folders by the user For (a), (b) and (c) all dynamic data files belonging to the software application may be automatically segregated and stored to the hidden partition. For (d) the selected files or all the dynamic data files belonging to the selected file folders may be automatically segregated and stored to the hidden partition.

An additional I/O driver may be placed between the file system I/O interface and a disk driver for access control, intercepting, filtering and re-directing data for the dynamic data files in the hidden partition. The access control, intercepting, filtering and re-directing may be by the use of regulatory, matching, and fulfillment tables. The additional I/O driver may be part of one or more of: the disk driver, the file system I/O interface, and the operating system.

The dynamic data files stored in the hidden partition may be protected. The dynamic data files stored in the hidden partition may be used as active working files and are continuously updated. The original dynamic data files stored in the main partition may also be continuously updated and may be used as mirror files.

A plurality of back-up copies of each dynamic data file in the hidden partition may be made in the hidden partition using a first-in-first-out sequence.

Upon accessing and modifying a working data file, the plurality of back-ups may be updated according to a pre-assigned back-up schedule.

In another form, the present invention provides a system for management of access to a host computer by a remote computer wherein access by the remote computer is in accordance with a software security access policy in the host computer.

The software security access policy may have a file access right and control mechanism. The file access right and control mechanism may be used to selectively provide protection to selected software applications and their respective dynamic data files.

The file access right and control mechanism of the host computer by the remote computer may be controlled by the host computer and includes:
  (a) selection of software application/programs;
  (b) selection of dynamic data files of the software application;
  (c) selection of configuration files;
  (d) selection of a data file or folder; and
  (e) selection of the type of the operation to be performed by the remote computer.

The selected file, or files belonging to the selected folder, may be automatically given the access right while any others will be denied access. The file access right and control mechanism of the host computer may be predetermined by a category of the remote host computer and different remote computers are given different access rights for different usage. All files including program, configuration and user data may be automatically given the access right while all others are denied access.

The selected software applications and their respective dynamic data files may be identified and are located in at least one partition of the primary operating system of the host computer. Dynamic data files may be identified and passed into a hidden partition on a hard disk of the host computer, the passing being by one or more selected from the group consisting of: copying and redirection. The host computer may use diagnostic utilities to allow remote technical support by the remote computer.

In a further form the present invention provides a system for providing an external back up for at least one computer to at least one hidden partition of a centralized back up server, wherein dynamic data files of the at least one computer are identified and passed into the at least one hidden partition on a hard disk of the central back up server, the passing being by one or more selected from the group consisting of: copying and redirection.

The at least one hidden partition of the central back up server may be accessed using at least one selected from the group consisting of a: LAN, WAN, VPN, Intranet and Internet. Critical applications and their dynamic data files may be stored and protected in the at least one hidden partition of the central back up server by using encryption and are only able to be accessed by authorized users.

For both the second and third forms, the host computer may have an additional I/O driver placed between a file system I/O interface and a disk driver for access control, intercepting, filtering and re-directing data for the dynamic data files, the additional I/O driver using a secondary operating system. The access control, intercepting, filtering and re-directing may be by the use of regulatory, matching, and fulfillment tables. The additional I/O driver may be part of one or more selected from the group consisting of: the disk driver, the file system I/O interface, and the primary operating system. The secondary operating system may be different than the primary operating system. Preferably, the back up uses one of the primary operating system and the secondary operating system; and recovery uses the secondary operating system. The remote access may be through the secondary operating system.

The invention in a final aspect also provides a computer usable medium comprising a computer program code that is configured to cause a process or to execute one or more functions to perform a system as described above.

All forms of the invention may be used individually, or in any possible combination.

DESCRIPTION OF THE DRAWINGS

In order that the invention may be readily understood and put into practical effect, there shall now be described by way of non-limitative example only preferred embodiments of the present invention, the description being with reference to the accompanying illustrative drawings in which:

FIG. 15 is an illustration of the relationship between the bitmap table and the memory blocks;

DESCRIPTION OF THE PREFERRED EMBODIMENTS

The first embodiment is a dual operating system environment for a computer system. The computer system has a primary operating system used for its normal working environment. The operating system may be, for example, a "Windows" operating system of Microsoft Corp. There is provided a separate system as a secondary operating system for software and data maintenance, back up and recovery. This separate system may be for example, a "Linux" operating system. The data backed up may include the primary operating system and software application. The secondary operating system may be transparent to a user. The secondary operating system is placed between the primary operating system of the computer and the dynamic data files. Therefore, all data passes through the secondary operating system of the present invention. This applies to data from the operating system to the dynamic data files, and the data flow from the dynamic data files to the operating system.

Depending on the size and availability of space on the hard disk in the computer system, a hidden partition is created and used for software and data maintenance, back up and restoration. The hidden partition is preferably at least one-third of the total hard disk space. For a high-end computer system having multiple hard disks, one of the hard disks may be allocated for the exclusive use for software and data maintenance, back up and recovery.

The hard disk may be partitioned into a number of drives for proper maintenance of the primary operating system, software application, and user data files. Every partition starts with a partition table that defines the boot indicator, partition type, and other attributes. For example, the partition type defines the type of file system to be used for the operating system. With the "Windows" operating system [Windows 98, Windows 2000, Windows XP], three types of file systems namely FAT16, FAT32 and NTFS are supported.

There is a special flag named "hidden" in the partition table. Upon activation by the software utility routine, any partition marked "hidden" will no longer be recognized and managed by the operating system. The partition is hidden, and not accessible to the primary operating system. Data stored in the hidden partition is isolated and thus protected. Furthermore, the presence of the hidden partition will not cause problems with the computer systems.

Figure 1:
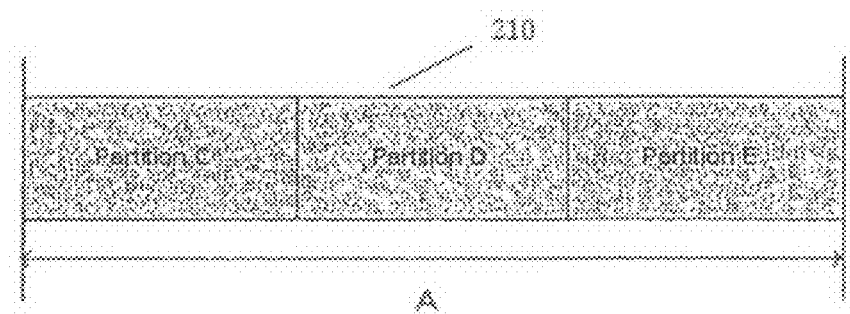
FIG. 1 is a typical hard disk structure of a computer system with three partitions.

FIG. 1 shows a typical hard disk partition structure without a hidden partition. The hard disk 210 is partitioned into three partitions (drives) named as C, D and E.

Figure 2:
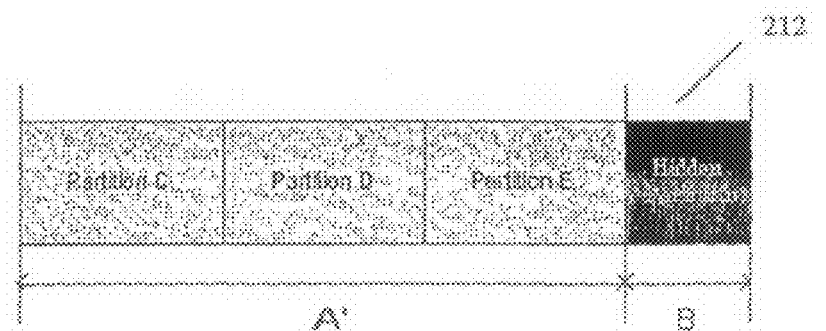
FIG. 2 is a hard disk structure of a computer system with three partitions and one hidden partition.

FIG. 2 shows a partition structure with a hidden partition 212 for hard disk 210. One or more of the normally used partitions C, D and E are reduced in size and the balance of the disk space is used for the hidden partition 212. However, the hidden partition 212 is not recognized by the computer's operating system so the total disk space recognized by the operating system is reduced. For example, if hard disk 210 has a capacity A of 100 GB, for the embodiment of FIG. 1, the C partition may have 25 GB, the D partition 25 GB and the E partition 50 GB. Once the hidden partition is created, the C partition may have 15 GB, the D partition may have 15 GB, the E partition may have 35 GB, and the hidden partition may have 35 GB. Accordingly, partitions C, D and E have a combined capacity A', hidden partition 212 has a capacity B, and capacity A is the sum of capacities A' and B. Preferably, the hidden partition 212 is at the last part of hard disk 210.

Figure 3:
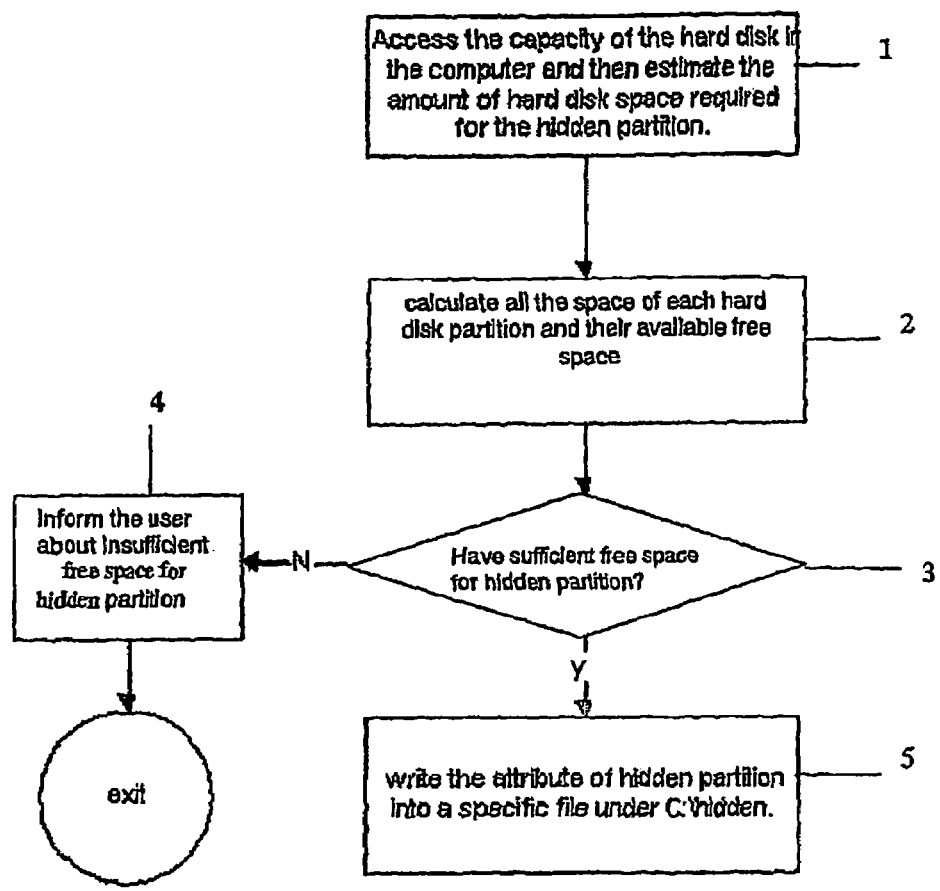
FIG. 3 is a process flow of calculating the amount of hard disk space required for the hidden partition and the availability of free hard disk space.

In order to construct a hidden partition 212 that has sufficient continuous free memory space, an initialization process is performed when the software is installed. This is shown in FIG. 3. A pre-scan of the entire hard disk is carried out to calculate the amount of free hard disk space available for the hidden partition 212 (1). The hidden partition 212 requires a reasonable amount of free space on the hard disk 210. This may be as a percentage of the total capacity of the hard disk 210, or as a predetermined minimum amount of hard disk space. If it is as a percentage, that may be a fixed percentage, or may be on a sliding scale depending on the total capacity of the hard disk 210. For example, it may be 30% to 35% for a hard disk capacity of 100 GB, but may be only 20% for a hard disk capacity of 1TB.

Assuming the hidden partition 212 requires 30% of the total hard disk space, the pre-scan determines the amount of free space on hard disk 210, as well as the total capacity of the hard disk 210. It then determines the percentage of the capacity of hard disk 210 that is free (2). If the available free hard disk space in percentage terms is less than the required amount (3) and thus is insufficient, the system will automatically halt after the pre-scan and display on the screen of a monitor a message that there is insufficient space on hard disk 210 for there to be a hidden partition 212 (4). If there is sufficient space, the system continues and constructs a hidden partition 212 (5), preferably at the last memory space of the hard disk. In order to construct a sufficient and continuous free memory space for the hidden partition, the system may rearrange the existing partitions and relocate data files from the hidden partition to another partition.

Figure 4:
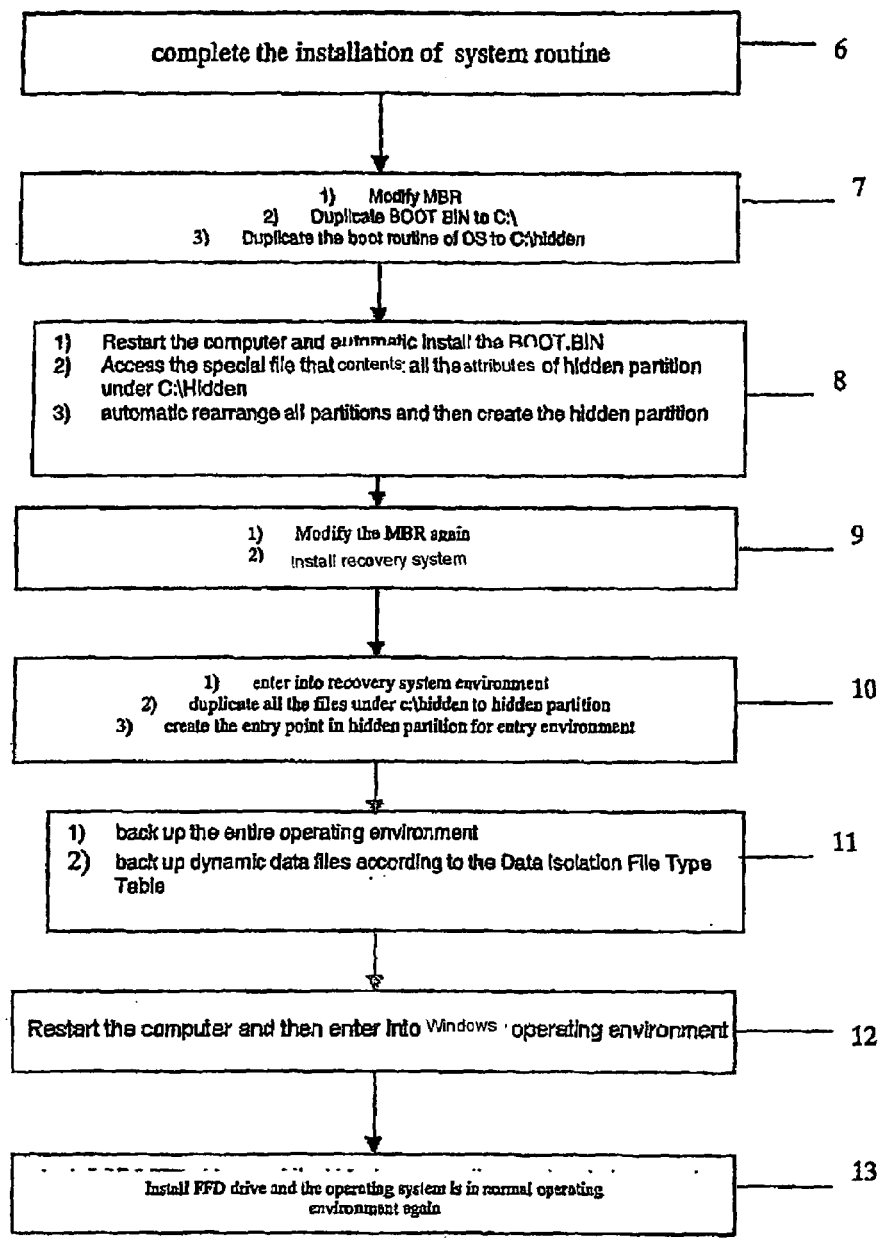
FIG. 4 is a process flow diagram of constructing an empty hidden partition.

Upon completion of the pre-scan and determination of the capacity of hard disk 210, an empty hidden partition 212 is constructed. The hidden partition can not be accessed by the primary operating system. FIG. 4 shows the detailed flow of constructing an empty hidden partition. As can be seen, after the relevant software is installed (6), the master boot routine modified and the boot routine duplicated (7), the computer system is rebooted, the attributes of the hidden file are accessed, the existing partitions are rearranged, and the hidden partition created (8). The modifications to the master boot routine ("MBR") set the hidden partition operating system as the active partition for next boot up. This will be automatically executed by the secondary operating system. The master boot routine is again modified and the recovery system installed (9). The master boot routine is automatically modified and returned to the normal active partition that operates under the primary operating system for the next boot up. A 30-second detection of the hot key sequence is inserted after the BIOS check sequence of the normal boot routine. The recovery system environment is entered, all files are duplicated into the hidden partition, and an entry point in the hidden partition is created for entry (10). The entire operating system is then backed up as are all dynamic data files according to the data isolation file type table (11).

The computer is rebooted and the normal operating system environment entered (12). The file filter driver ("FFD") is installed and the operating system returns to normal (13).

To identify dynamic data files within the operating system, the software inventory of the computer is obtained. Dynamic data files may include system or software configuration files, and user data files. After collecting the software inventory of the computer, the dynamic data files determined from the inventory are backed up into the hidden partition.

Preferably, all the I/O operations in the system are monitored. Any I/O operation to access the dynamic data files will be redirected to the active working dynamic data files in the hidden partition. As a result, the active working copy of the dynamic data files is copied from the original document files on the hard disk to the duplicated document files in the hidden partition during installation of the secondary operating system. Furthermore, the secondary operating system will automatically perform a back up to the duplicated dynamic active working data files in the hidden partition whenever and as the files are modified.

Figure 5:
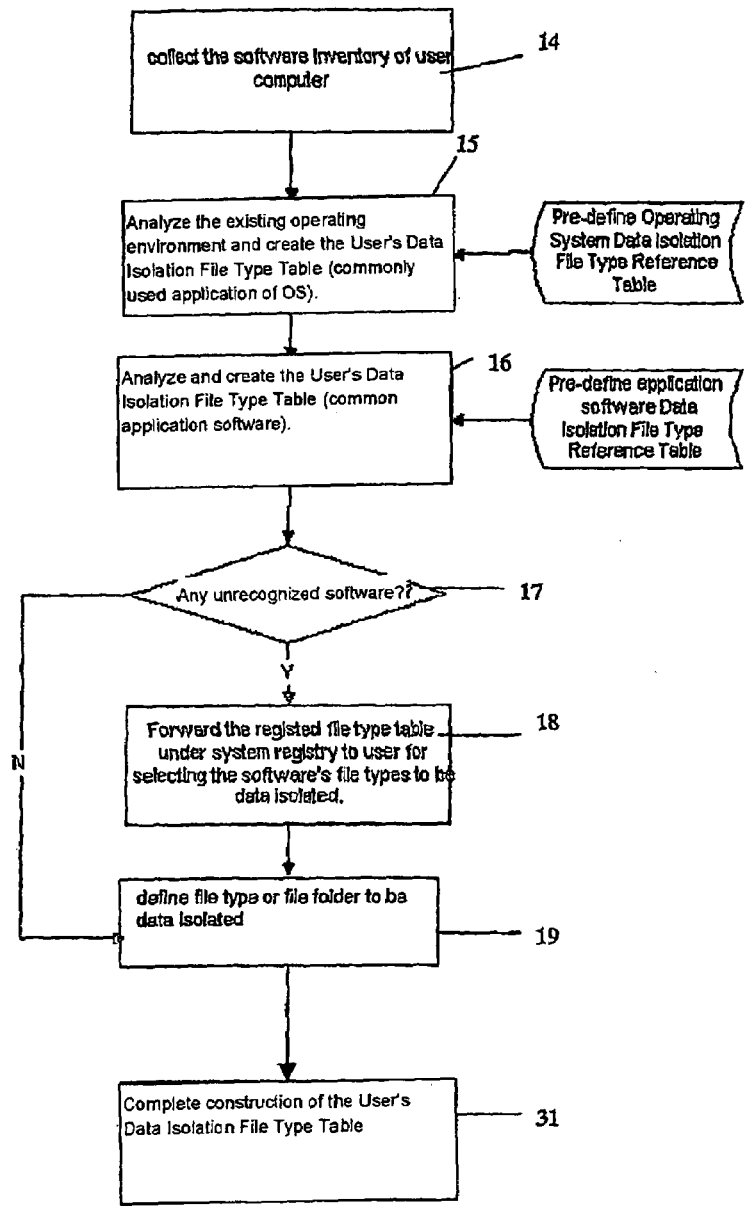
FIG. 5 is a process flow diagram of setting up a data isolation file type table.

To create a user data isolation file type table the process flow of FIG. 5 is followed. Due to differences in hardware and operating systems, and also users' different use requirements, which of the software applications and their respective data files are important to different users will vary. As such, a method of identifying and separating the dynamic data files of the important software application files is used. This may include one or more of four ways:

(a) Through analysis and segregating the common applications of the operating system. The most commonly used applications of a "Windows" operating system are set out in Table 1.

TABLE 1

| Type | Definition | Characteristic | Status |
| --- | --- | --- | --- |
| Address book | Address book of Window OS | These files (*.WAB) are stored in a specific place of the operating system. Users go through the registry to obtain its location. | Very important |
| Email | Emails in Outlook Express | By default, it is stored in the operating system. When a system failure occurs, all email is lost. User goes through the registry to obtain its location. | Very important (some users may use other email software) |
| Favorites | Store the bookmarks of user's favorite URLs. | By default, it is stored in the operating system. User goes through the registry to obtain its location. | Very important (some users may use other explorers) |
| My Document | System default file directory. It includes My Music, My Picture, and etc. | Stored together with the operating system. When a system failure occurs, the files stored under this directory may be lost or corrupted. | Very important |
| My Desktop | | Stored together with the operating system. When a system failure occurs, all the files stored in this directory will be lost. | Very important |
| Character Set | | Stored together with the operating system. When a system failure occurs, all the data will be lost. | Very important |
| User define Character Set | | Stored together with the operating system. When system failure occurs, all data will be lost. | Very important |
| Cookies | Store in system default location. | Stored together with the Operating system. When a system failure occurs, all data will be lost. | Very important |

(b) Through analysis and segregating the commonly used software applications. The most commonly used applications are in Table 2.

TABLE 2

| Type | Application | Characteristic | Status |
| --- | --- | --- | --- |
| Word Processing | MS Word | This is the most commonly used word processing software. It supports the .doc, .rtf and .dot formats. | Very important |
| | Word Perfect | It supports the .wpd and .doc formats. | Normal |
| Spreadsheet | MS Excel | This is the most popular spreadsheet software in MS Office. Its file extension is .xl*. | Very important |
| Electronic Email | MS Outlook | It is the most popular email system in MS Office. Its file extension is .pst. | Very important |
| | Lotus cc:Mail | A popular email system mainly used in offices | Normal |
| Database | MS Access | This is the database software in MS Office. Its file extension is mdb. | Very important |
| Utilities | Winzip | This is the most popular data compression software. It supports .zip, .arj and etc formats. | Very important |
| | McAfee's Anti-Virus | Popular anti-virus software. | Normal |
| | Norton's Anti-Virus | Very popular anti-virus software. | Normal |
| Web Page Development & Browsers | MS Internet Explorer | Very popular Internet explorer. It supports htm, html, xml, asp and etc formats. | Normal |
| | Netscape | Popular Internet explorer. It supports htm, html, jsp and etc formats. | Normal |
| | MS FrontPage | Popular html produce tool. It supports htm, html and asp formats. | Normal |
| Personal Communications | MSN Messenger Yahoo Messenger ICQ AOL Instant Messenger | | |

(c) Through analysis and segregating unknown software applications. For software applications not listed in Table 2, the software registration table is checked to determine any such unknown software application and its respective data for data isolation.

(d) Through analysis and segregating user-defined data files. The user may define data file types, or folders, for protection. This is shown in Table 3.

TABLE 3

| Type | Definition | Characteristic |
| --- | --- | --- |
| File | Single file | Specific file name |
| | Particular type of files | All files with this extension. It can distribute in various partitions. |
| File Folder | A specific file folder | All files under this directory will be duplicated into the hidden partition. All the subsequent files stored into this directory will also automatically be duplicated into the hidden partition. |

As can be seen from FIG. 5, after the inventory of the software on the computer is conducted (14) and the user's data isolation file type table is created (15) in accordance with one or more of (a) to (d) above. As shown, a combination of (a) in step 15, (b) in step 16, (c) in step 18 and (d) in step 19, is used. The table is then constructed (31).

Figure 6:
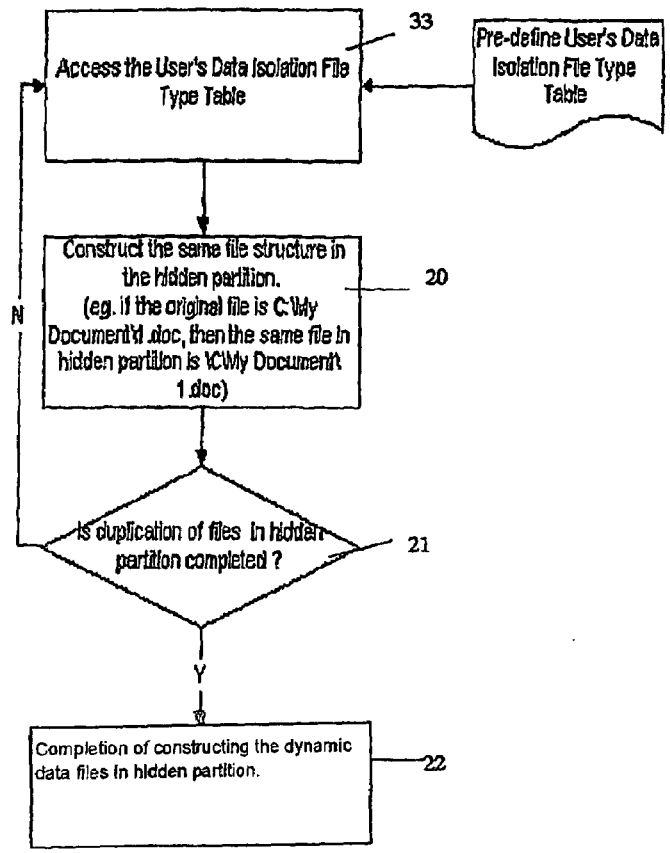
FIG. 6 is a process flow diagram of duplicating the dynamic data files of a selected software application into the hidden partition.

Upon completion of creation of the empty hidden partition and the user data isolation file type table, a duplicate copy of the data files of the selected software application will be copied into the hidden partition. FIG. 6 shows the detailed process flow of this. After accessing the user data isolation file type table (33), the same file structure is constructed in the hidden partition (20). A check is performed (21) and, if completed, the construction of the hidden partition is concluded (22). By using the same file structure in the hidden partition, links can be provided between software static routines and their associated dynamic data files.

It is possible to add or delete data file types in the data Isolation file type table especially when there is a change in the user-operating environment. The data isolation file type table is preferably stored in the hidden partition to prevent corruption.

As shown in FIG. 5 and described above, there are two types of pre-defined applications for data isolation. One is the pre-defined common applications of the operating system—(a) as described above. The other is the pre-defined common software application—(b) as described above. They may be the same. During installation of the software and data maintenance, back up and recovery system, the system will automatically analysis the user operating and software environment, and use the pre-defined user data isolation file type table for data isolation. Subsets (a) and (b) of the data isolation file type tables may be used to determine data in commonly used applications of operating systems and software applications.

Through the FFD routine, the system is able to intercept the I/O file access operation to obtain the file attribute and operation of all files loaded into the computer, or being sent from the computer. This is shown in Table 4.

TABLE 4

| Type | Content | Remark |
| --- | --- | --- |
| Attribute of file | Path of file | E.G. c:\My Document\1.doc |
| | Name of file | 1.doc |
| | Extension of file | Doc |
| | Size of file | 12.284 M |
| | Modification Time | 2003/3/8 |
| Operation of file | Read | |
| | Write | |
| | Modify | |
| | Rename | |
| | Move | |
| | Delete | |

(a) Regulatory table

Figure 7:
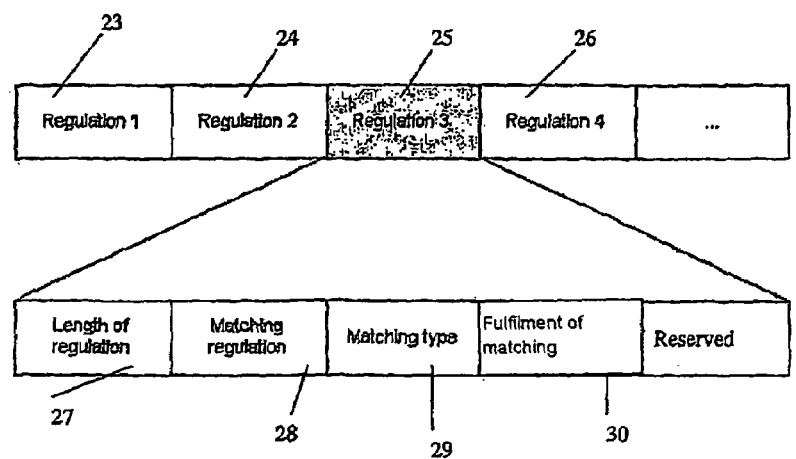
FIG. 7 is a structure of a regulatory table.

During installation of the FFD routine, the regulatory table is read and stored. Subsequent accessing of the regulatory table is an internal operation of the system to allow a faster system response. FIG. 7 shows the structure of the regulatory table. For each regulation (23, 24, 25, 26) there is the length of the regulation (27), matching regulation (28), matching type (29), and fulfillment of matching (30).

(b) Matching regulatory table (28)

When a file operation is intercepted by the FFD routine, the FFD routine will obtain the attributes of the file and use the attributes to perform matching with the pre-defined regulatory table. Once a matching is fulfilled, it will execute accordingly. Otherwise, it will pass the file access operation back to the operating system for processing by the operating system.

(c) Fulfillment of matching (30)

When a matching condition is fulfilled, it will execute accordingly. This is shown in Table 5.

TABLE 5

| Type | Scope | Detail |
| --- | --- | --- |
| Re-direction | Including all the I/O operation of this file | Read/write, rename, delete, move etc attributes. |
| Log file | Record the changes in this file to Log file (File Modification Table). | Change time, location, type of operation (write, rename, delete, move and etc). |
| Reservation | Reservation for future expansion | |

(d) Pre-define Data Isolation File Type [commonly used applications of the operating system] Reference Table.

According to the user data isolation file type table, the system is able to pre-determine the commonly used applications of the operating system reference table as is shown in Table 6.

TABLE 6

| No. | Application | Matching Regulation | Action | Remark |
| --- | --- | --- | --- | --- |
| 1 | Address Book | C:\Documents and Setting\%UserName%\Application Data\Microsoft\Address Book\%UserName%.wab | Re-direction | %UserName% refers to the existing registered user |
| 2 | Email | Can use registry to obtain the stored location of *.dbx | Re-direction | |
| 3 | Favorites | C:\Documents and Settings\%UserName%\Favorites | Re-direction | %UserName% refer to the existing registered user |
| 4 | My Document | C:\Documents and Setting\%UserName%\ | Re-direction | %UserName% refers to the existing registered user |
| 5 | My Desk | C:\Documents and Setting\%UserName%\Desk | Re-direction | %UserName% refers to the existing registered user |
| 6 | Character Set | C:\WINDOWS\Fonts | Re-direction | |
| 7 | User define Character Set | Distribute in C:\Documents and Settings\Administrator\Application Data\ | Re-direction | |
| 8 | Cookies | C:\Documents and Settings\%UserName%\Cookies | Re-direction | %UserName% refers to the existing registered user |

(e) Pre-define Data Isolation File Type [common software application] Reference Table.

According to the User's Data Isolation File Type Table, it is possible to pre-determine the common software application reference table as shown in Table 7.

TABLE 7

| No. | Application | Data file extension | Action | Remark |
| --- | --- | --- | --- | --- |
| 1 | Word Processing | *.DOC, *.RTF, *.DOT | Re-direction | |
| 2 | Spreadsheet | *.XL? | Re-direction | |
| 3 | Electronic Email | *.PST, . . . | Re-direction | |
| 4 | Database | *.MDB | Re-direction | |

TABLE 7-continued

| No. | Application | Data file extension | Action | Remark |
|---|---|---|---|---|
| 5 | Utilities | *.ZIP; *.ARJ, *.RAR, including all those files related anti-virus applications | Re-direction | |
| 6 | Web Page Development &Browsers | *.HTM, *.HTML, *.XML, *.ASP | Re-direction | Need to protect all the related files in the active partitions. |
| 7 | Personal Communications | Need special customization | Re-direction | |

After duplicating the dynamic data files of the selected software application into the hidden partition, the dynamic data files in the hidden partition are assigned as active working files and are continuously updated. An I/O file filter driver (the FFD) may be added to the existing operating system to enable this to happen. All the file accesses in the operating system will be monitored and interpreted.

All accesses to the dynamic data files in the operating system (those not in the hidden partition) will be handled by the operating system in their original location. All accesses to dynamic data files in the hidden partition will be re-directed by the system to the hidden partition to enable direct access to those files. This re-direction process to access the protected files in the hidden partition is automatic, and is preferably transparent to the user. The original copy of the dynamic data file on the main hard disk is retained as a mirror file and continuously updated.

Figure 8:
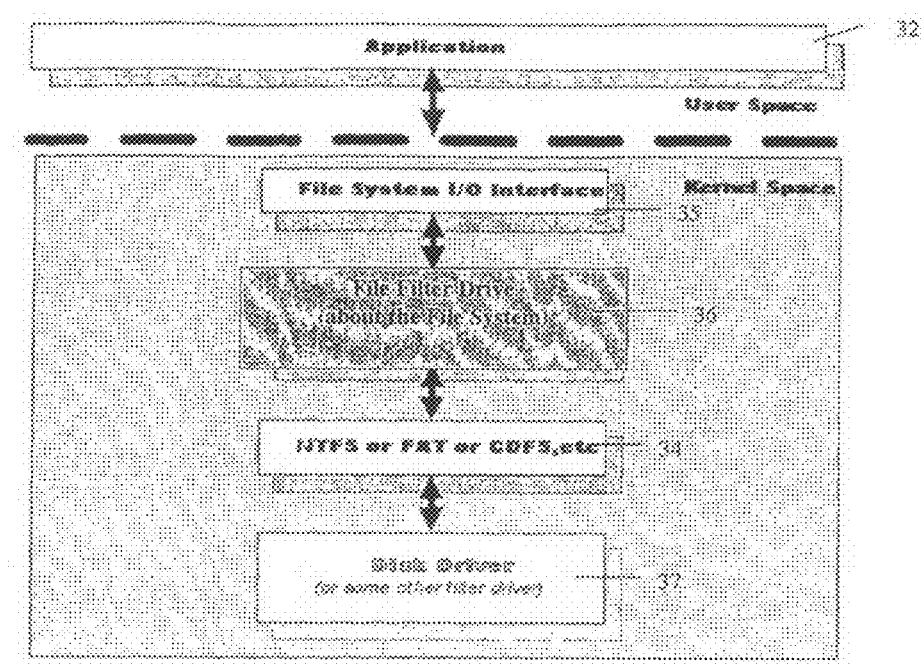
FIG. 8 is a structure of a file access system in a typical operating system.

FIG. 8 shows the file system access structure with the operating system application 32, such as, for example, "Windows", MS Dos, and WIN32 application. The software application 32 is operating in the user space. Under the structure in the kernel space, an add-in enhanced FFD 36 is inserted between the file system I/O interface 35 and the NT file system, FAT file system, CD-ROM file system, and so forth, 34. The file system 34 instructs and reacts to data from disk driver 37. The FFD 36 is capable of monitoring and intercepting all system and user I/O operations including read/write, rename, delete, and so forth, to files. The FFD 36 is also capable of selectively accepting or rejecting access to files under protective isolation. This is particularly useful in remote file access management. Any other IFS drivers (37) are in parallel with the FFD (36).

Figure 9:
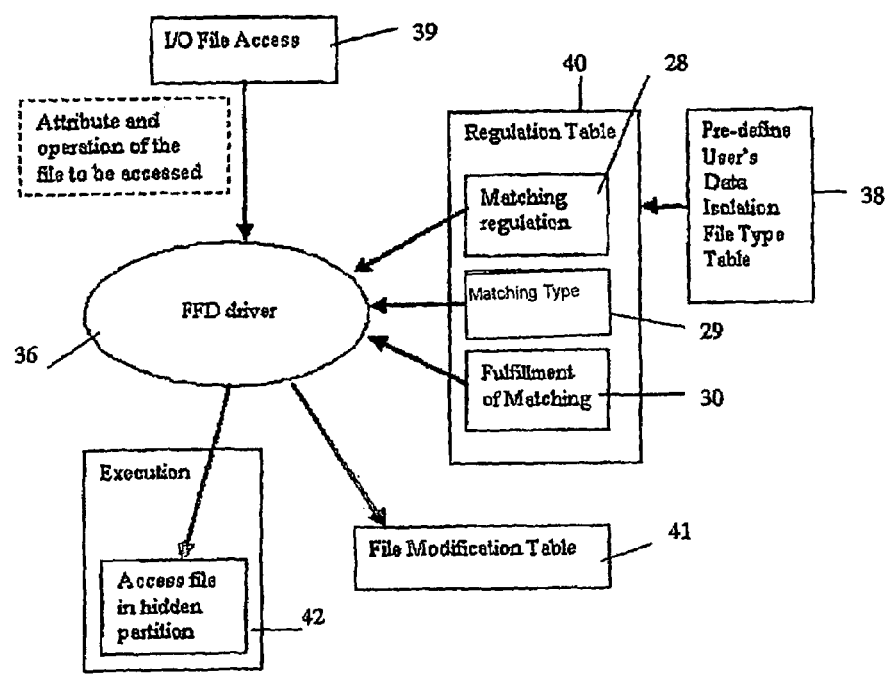
FIG. 9 is a detail of a file access structure around the enhanced file filter driver ("FFD")

FIG. 9 shows the file access structure around the FFD driver. The FFD driver interacts with I/O file access (39); regulation table (40) including matching regulation (28), matching type (29) and fulfillment of matching (30); file modification table (41); and hidden partition access (42). The regulation table (40) interacts with the data isolation file type table (38).

Figure 10:
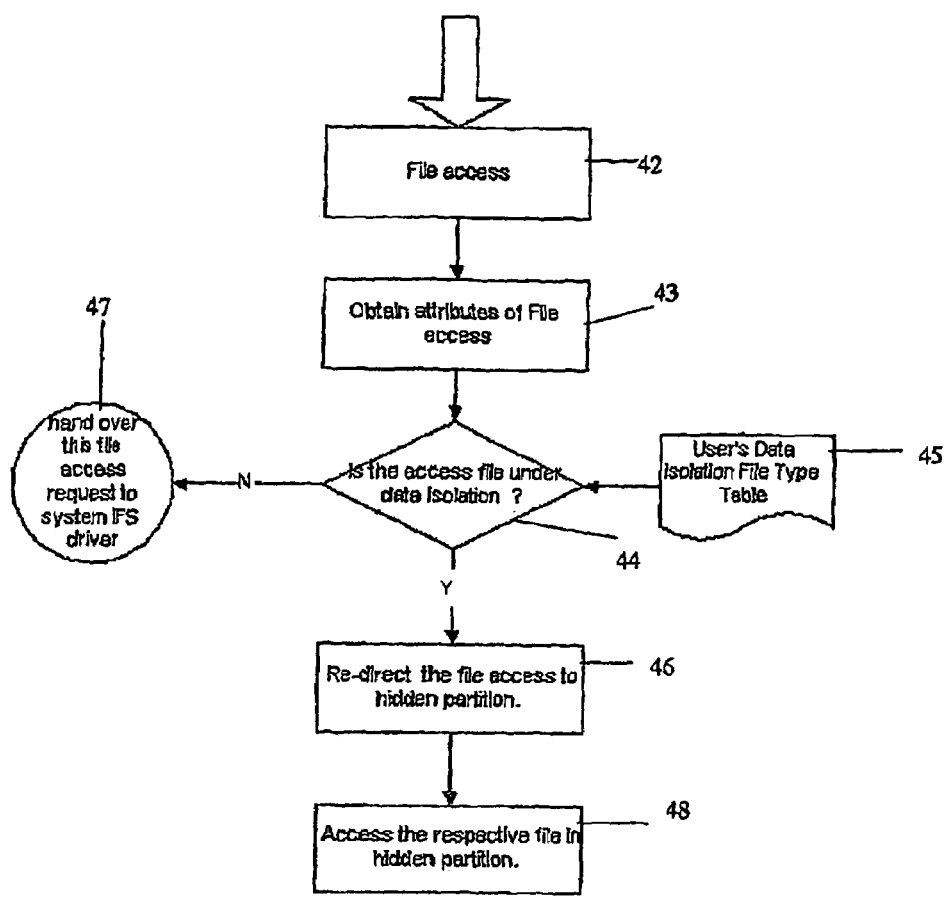
FIG. 10 is a process flow diagram of the modified I/O file access operation with the FFD.

As shown in FIG. 10, when the operating system intends to open an existing file or create a new file, this request will be intercept by the FFD that accesses the file (42) and obtain the attributes of the file (43). The FFD 36 will inspect the intention of this request and check (44) with the data isolation type table (45) stored in the hidden partition. If the request file or file type Is being protected, this I/O operation request (39) will be intercepted and handled by the FFD (36) by access to the hidden partition (46) and thus the files (48). Otherwise, this operation will be handled over to the Windows I/O driver for completion (47).

Figure 11:
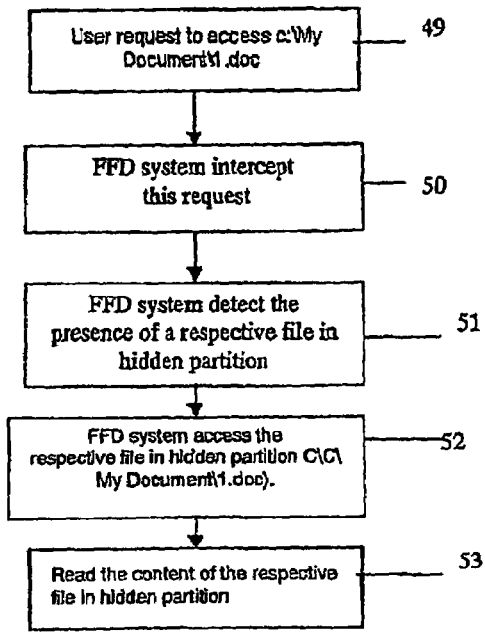
FIG. 11 is an example of reading a dynamic data file in the hidden partition.

FIG. 11 shows an example of an attempt to read a protected file named 1.doc. Here, upon receipt of the access request (49) the FFD intercepts the request (50) and detects the presence of the file in the hidden partition (51). The FFD then accesses (52) the file in the hidden partition and reads (53) the content of the file in the hidden partition.

Figure 12:
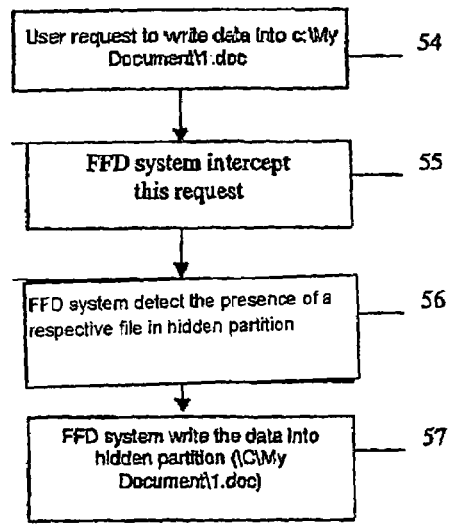
FIG. 12 is an example of writing data into a dynamic data file in the hidden partition.

In FIG. 12 there is shown an example of an attempt to write a protected file named 1.doc. Again, upon receipt of the request (54), the FFD intercepts the call (55) and detects the presence of the file in the hidden partition (56). The FFD then writes (57) the data to the file in the hidden partition.

In the hidden partition, all the dynamic data files will be backed up whenever they are accessed and modified. The back up system will maintain up to three back up copies of each dynamic data file in the hidden partition in first-in-first-out (FIFO) sequence. More back up copies or roll back points for every dynamic data file are possible, but would require more memory space reserve for the hidden partition. By default the recovery system will use the last back up for recovery. However, it is also possible for a user to select a previous data file back up in the circular FIFO for recovery. For example, to restore a previous data file that has been overwritten without a back up being made.

Figure 13:
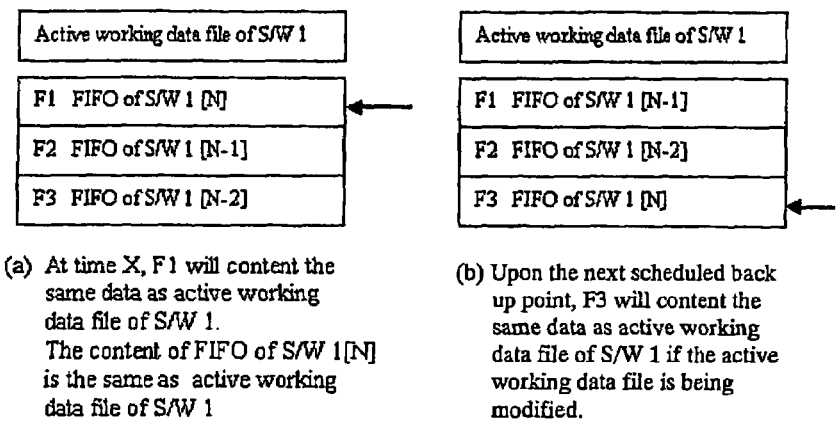
FIG. 13 is a illustration of a circular first-in-first-out ("FIFO") operation for an active working data file in the hidden partition.

FIG. 13 shows a detailed FIFO buffer of a dynamic data file in the hidden partition. Every data buffer consists of one working and three back up data files. In the FIFO, the [N] copy of the data file will always contain the up-to-date data file as the working data file. Upon accessing and modifying the working data file, the [N-2] copy of the FIFO will be updated and have the same content as the modified working data file according to the pre-assigned back up schedule, this may be set in terms of weeks, days, hours or minutes. This [N-2] copy of the FIFO is reassigned as the [N] copy. The old [N] and [N-1] copies become [N-1] and [N-2] copies respectively. As mentioned, the use of the data isolation technique to the software and data maintenance, back up and recovery system is to recover the data lost during a system failure. If the system can maintain and backup the entire system environment when it is in a normal working condition, the system can always resolve an unstable or failed system condition by restoring the normal working system environment after detection, prior to, or after system failure. A normal working operating environment is then resumed.

In general, software including operating system and data maintenance, back up and recovery consists of two processes as shown in Table 8:

(1) maintenance and back up of software including the operating system and data to the protected hidden hard disk partition; and (2) recovery and restoring of the software and operating system from the protected hidden hard disk partition.

Three different back up types may be supported as shown in Table 8:

TABLE 8

| Type | Usage | Details |
| --- | --- | --- |
| Original full back up | Conduct an original full back up initially. | Back up a complete copy of the user operating system, software and data of the present environment in the active partitions into the hidden partition according to track format of the hard disk. |
| Incremental back up | This is an incremental back up with reference to the original full back up.<br>It can also include the temporary back up into this back up if required. | Back up the differences (e.g. modified files, additional new files and remarked deleted files) between the original full back up and the existing operating environment into the hidden partition in compressed format. |
| Temporary back up | This is the latest incremental back up of the system. | Back up the differences (e.g. modified files, additional new files and remarked deleted files) between the last incremental back up and the existing operating environment into the hidden partition in compressed format. |

Upon installation of the software and data maintenance, back up and recovery system, an original full back up is performed.

Figure 14:
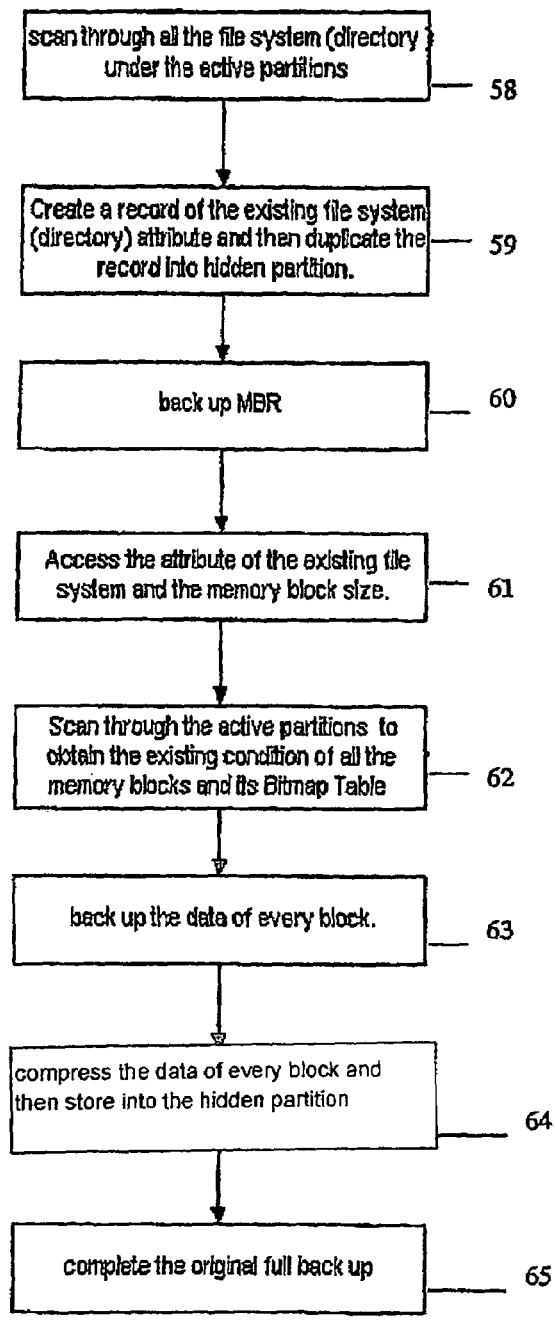
FIG. 14 is a process flow diagram of an original full back up.

As shown in FIG. 14, the original full back up is based on the block level of the hard disk. Before back up, hard disk is scanned (58) to identify those blocks that contain data. A record is created (59), the MBR is backed up (60), the attributes of the file system and memory block is accessed (61) and a scan is conducted of all active partitions to obtain the existing condition of all memory blocks and its bitmap table (62). These blocks are backed-up (63), compressed (64) and stored into the hidden partition (65). Empty blocks will not be backed-up. This will greatly improve the efficient usage of the hidden partition.

FIG. 15 shows the relationship between the bitmap table and the memory blocks. The bitmap table contains the status every memory block. If the memory contains data, its respective bitmap will contain a 1; otherwise it will contain a 0.

Incremental back up is operated under the normal operating environment of the computer. It can be invoked either by the intent to carry-out an incremental back up, or automatically when the operating system detects a new software or hardware driver being installed. Under incremental back up, the system will back up the differences with a special listing record file between the original back up environment and the current operating environment and the back up will be to the protected hidden partition. All modified and additional document files are backed-up and remarked in the special file. All the missing document files are recorded and remarked in the special file.

Figure 16:
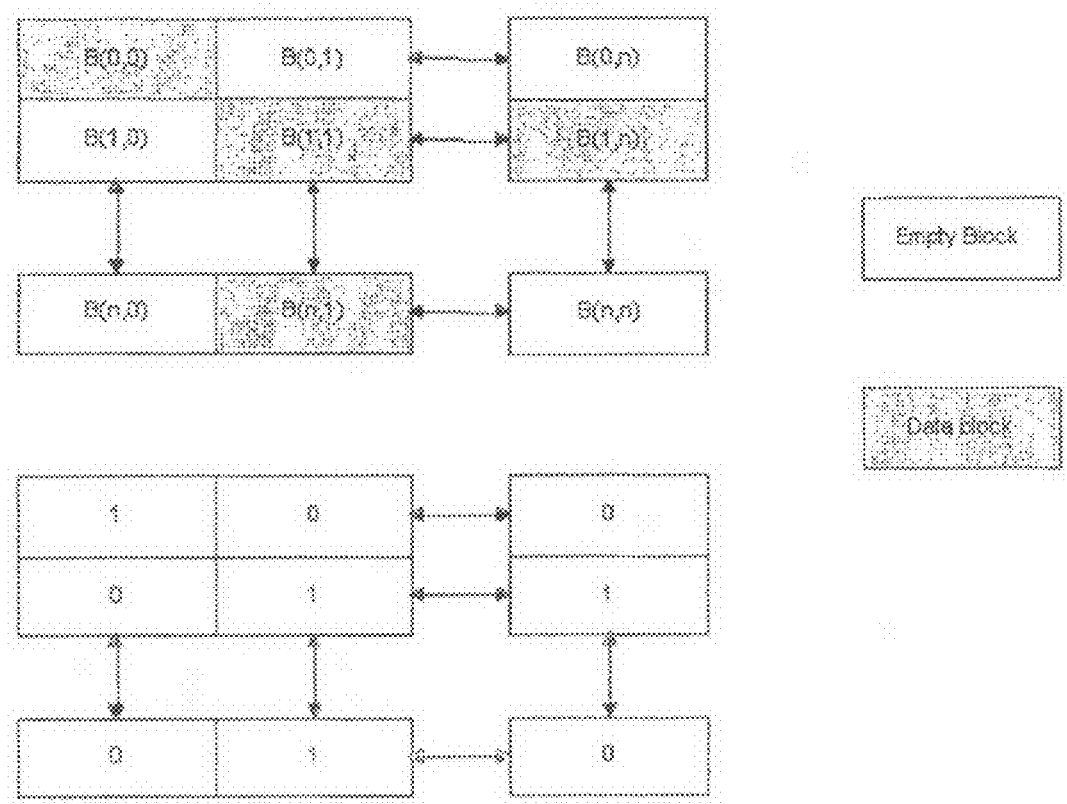
FIG. 16 is an illustration of the modified in/out ("I/O") file access with FFD system interception.
Figure 16:
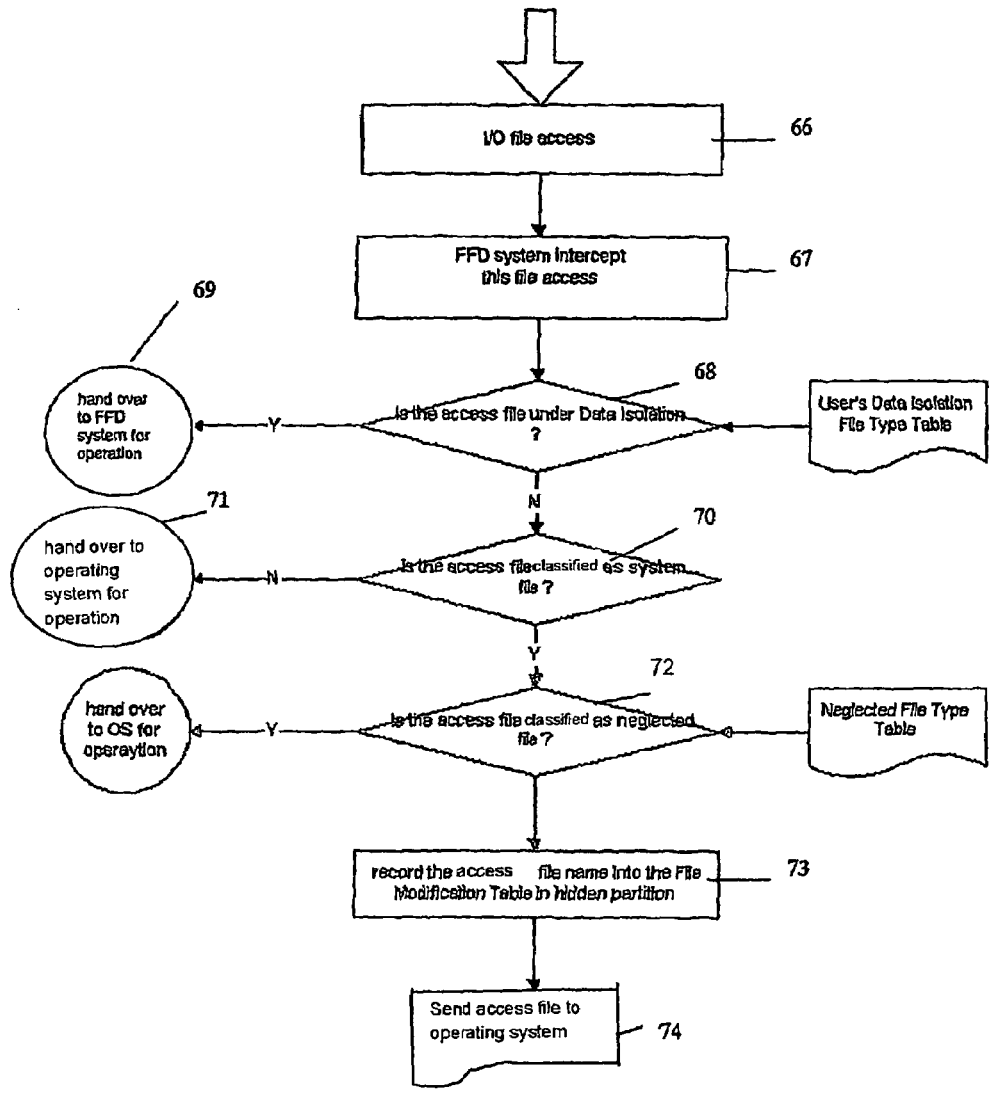

As shown in FIG. 16, after the original full back up (FIG. 14) and entry into the operating system, the add-In FFD will start to monitor and intercept (67) all the I/O file access (66) operations by the operating system. If the access file is protected in the hidden partition (68), it will automatically re-direct (69) the access to the hidden partition. If the access file is a system file, it will be (70) handed over to the operating system (71) for operation. If the access file is unprotected and classified as a neglected file type (e.g. system swap file, *.tmp files, and so forth) (72), it will record (73) the name of this file into the "file modification table" stored in the hidden partition, and send the file to the operating system for operation (74).

Figure 17:
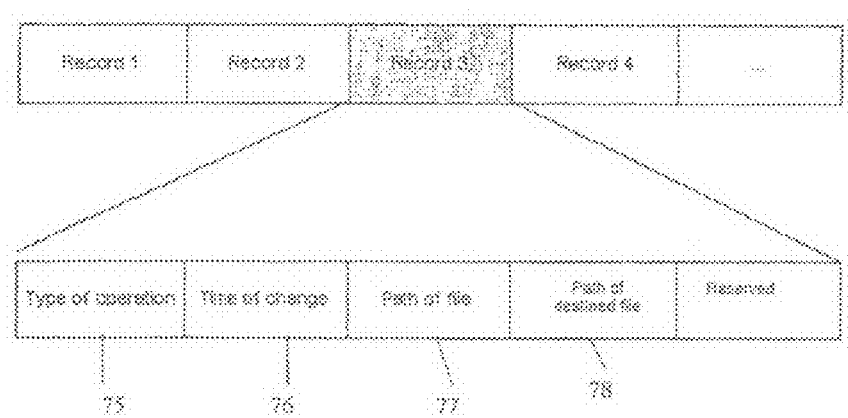
FIG. 17 is an illustration of the structure of the file modification table.

The file modification table is shown in FIG. 17. Through the FFD, it can obtain the information of file changes and then record these changes into the file modification table as follows;

(a) type of operation (75): Write, Rename, Delete or Move;

(b) time of change (76);

(c) directory path and file name (77); and (d) destined directory path and file name (78) (used for change path or rename).

Figure 18:
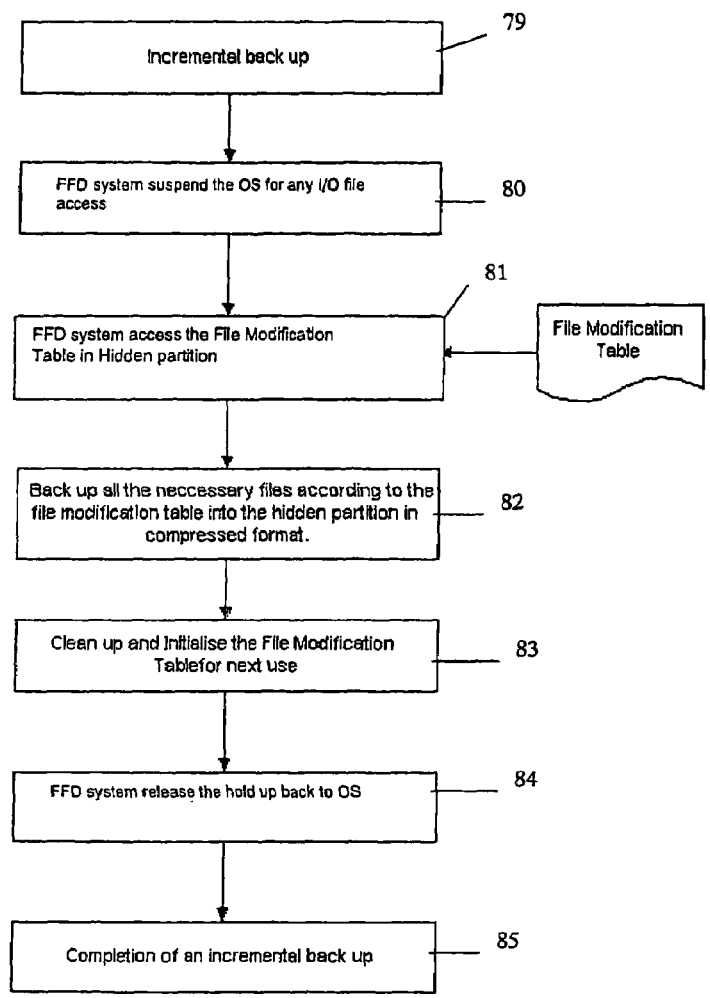
FIG. 18 is a process flow diagram of an incremental back up.

As shown in FIG. 18, the incremental back up (79) is based on the changes in the file modification table with changes being backed up in compressed format to the hidden partition. During the incremental back up, it is required to suspend all system operations (80) until the back up is completed. The file modification table is accessed (81) and all required files are compressed and backed-up (82).

The temporary back up is the same as the incremental back up. It is always the last incremental back up of the system.

After installation of a new software application or hardware driver that results in instability or failure of the computer system, the recovery process is invoked to restore the original stable state. Regardless of which of the three types of back up has been previously used, any type of back up can be selected for recovery.

There are two ways that a user can select to restore the normal operating environment when the computer encounters a system failure:

(1) use a pre-assigned key such as, for example, F12, as a hot key during power up to enter into the operating environment directly as shown; and (2) invoke the recovery process from the operating system and the operating system will automatically restart the computer in the recovery operating environment.

Figure 19:
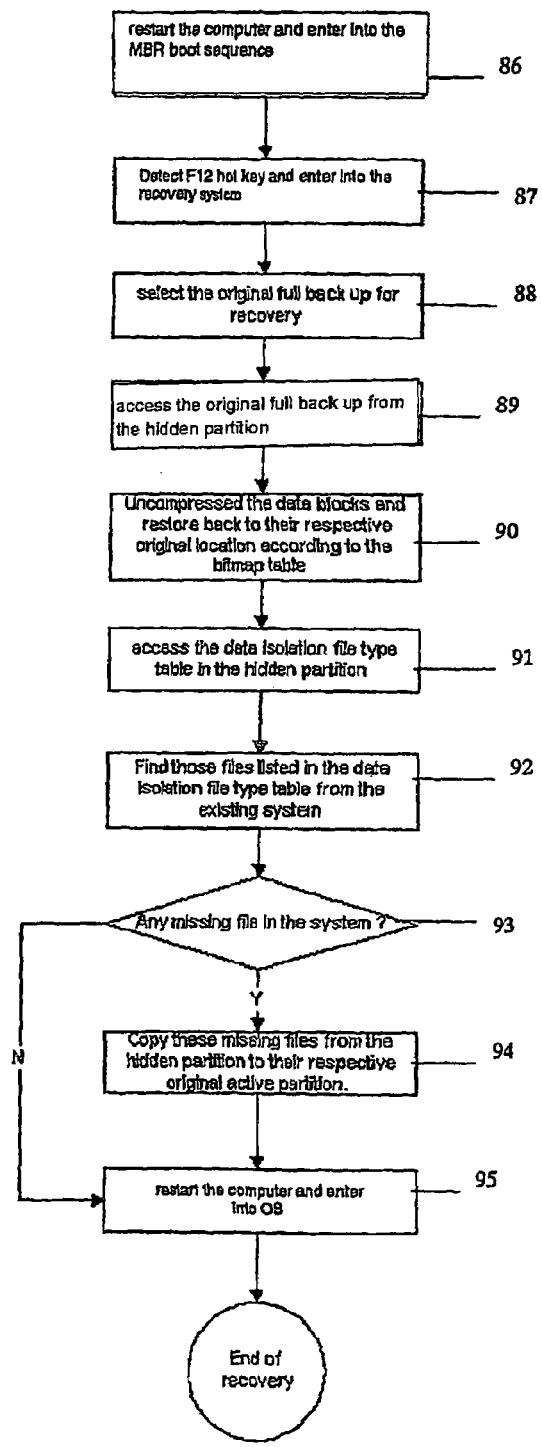
FIG. 19 is a process flow diagram of a system recovery by using original full back up.

In FIG. 19 is shown the process flow for the system to enter into the recovery system upon detection of hot key pressing during power up. During power up (either initially or at restart) (86), it detects (87) the hot key having been pressed. In the recovery system environment, the user can select (88) one of the three types of back up system for recovery. During recovery, it will first access the original full back up (89) in the hidden partition then restore the back up operating system to the active partition (90) according to the bitmap table. Then, it will inspect the data isolation file type table in the hidden partition (91) and check the respective files in the active partitions (92). If it discovers missing files in the active partitions (93), it will copy back the files from hidden partition to the respective location in the active partition (94) then restart the computer (95). If there are no missing files, it proceeds directly to the restart (95).

Figure 20:
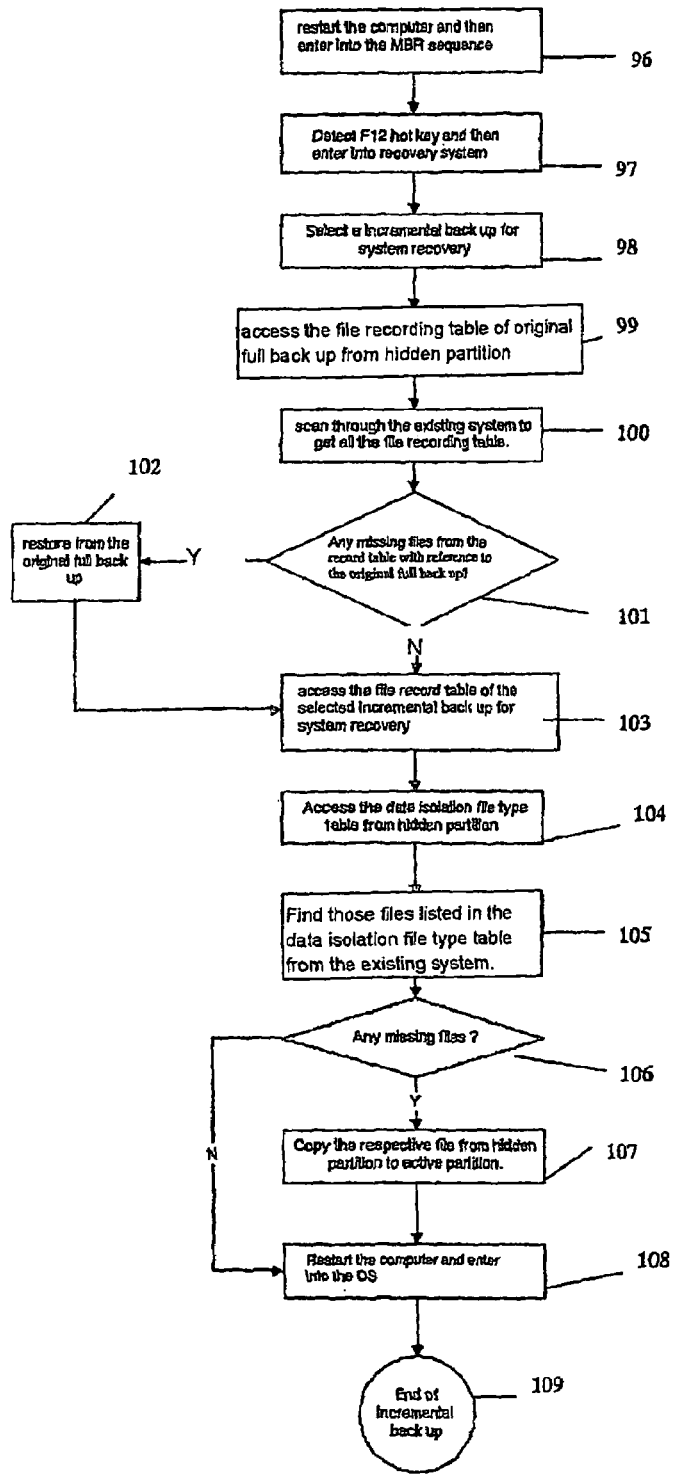
FIG. 20 is a process flow diagram of a system recovery by using incremental back up.

In FIG. 20 is shown the process flow of restoring the computer system by using an incremental back up. The process flow of restoring the computer system by using the incremental back up, or a temporary back up, is the same. After restarting the computer (96) either as a reboot or initial start, the pressing of the hot key is detected (97) and incremental back up is selected for recovery (98). The file record table of the full back up on the hidden partition is accessed (99) and a scan is conducted to gather all file record tables (100). If there are any missing files from the record table with reference to the full back up (101), restoration proceeds from the original full back up (102). If there are missing files, the file record table of the selected incremental back up is accessed (103) and the data isolation file type table accessed (104). From that table are extracted those files from the existing system (105). If there are no missing files (106), the computer is restored and the normal operating system entered (108). If there are missing files, the missing files are copied from the hidden partition to the active partition (107), the computer is restarted and the normal operating system re-entered (108). The restoration ends (109).

Through the system recovery, the operating system and software will be recovered from the hidden partition and copied to the active partitions while retaining all data in its latest status. The normal operating system environment is restored from the previous state, when a system failure occurs.

When using the original full back up for recovery, any previous incremental back (if present) will not be deleted.

Figure 21:
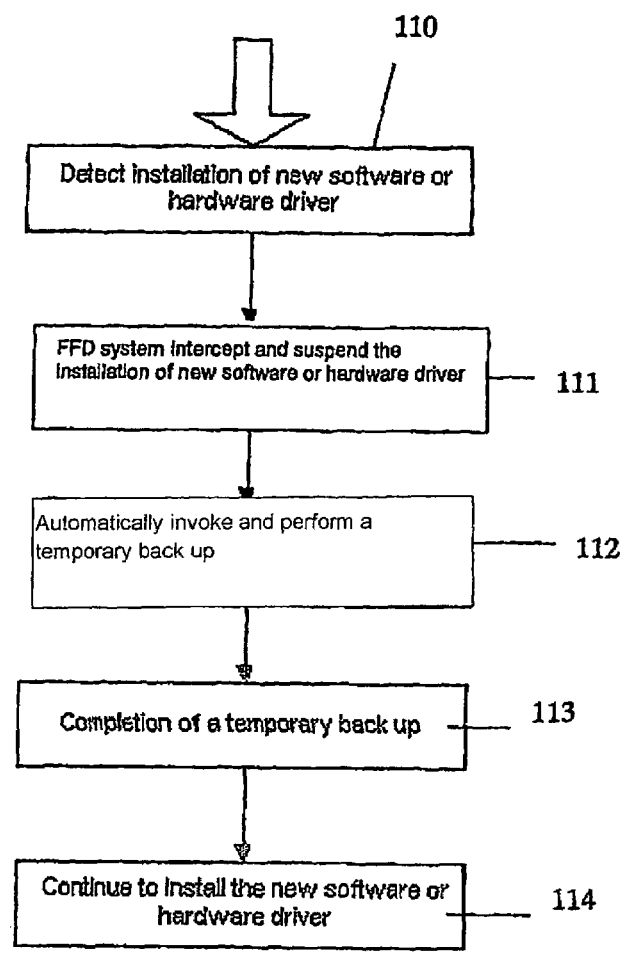
FIG. 21 is an illustration of an automatic process flow of carrying out a temporary back up.

Many system instabilities or failures are caused by installing an unstable hardware driver, or an unsuitable software application. The software and data maintenance, back up and recovery system has an automatic mechanism as shown in FIG. 21. Once the system detects the installation of a new software application or hardware driver in the computer system (110), it will automatically suspend the installation (111) and performs a back up of the existing system environment (112). After completion of the back up (113), it will resume the installation. Subsequently, if system instability or failure is encountered (114) after the installation or running of the new application, the computer system can easily restore the previous operating environment from the last back up.

When the primary operating environment is damaged, it is still possible to restore the operating environment with up-to-date data files system.

Figure 22:
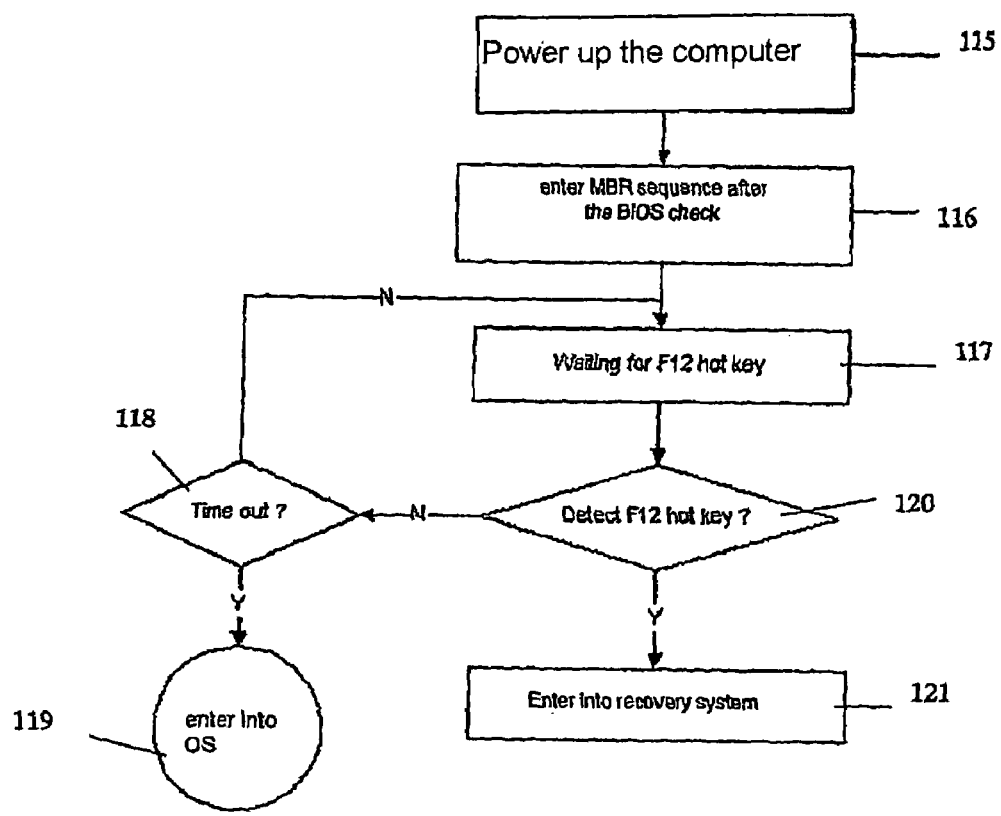
FIG. 22 is a process flow diagram of entering into the recovery system through use of a hot key.

FIG. 22 shows the detailed process flow diagram of the hot key invoking a system recovery.

As mentioned earlier, the master boot routine is automatically modified after the installation of the software and data maintenance, back up and recovery system. After powering up the computer (115) the normal power-up sequence of the computer system is redirected to the recovery system for a predetermined time such as, for example, 30 seconds after the BIOS check routine (116). The system will enter into the recovery operating environment (121) for system recovery upon detection of the hot key (117, 120). Otherwise (118), it will resume the normal powered up process and enter into the operating system (119) environment.

The software and data maintenance, back up and recovery in a stand alone computer system may be extended to an external storage server within a communication network.

This data isolation technique may perform software and data maintenance, back up and recovery in an external computer system within a communication network.

The structure of a computer network consists of a host and a remote computer system connected by the Internet, a LAN, WAN, Intranet, and so forth. A remote computer system may use its remote access management routine [remote version] to access and control the host computer system with a remote access management routine [host version].

Figure 23:
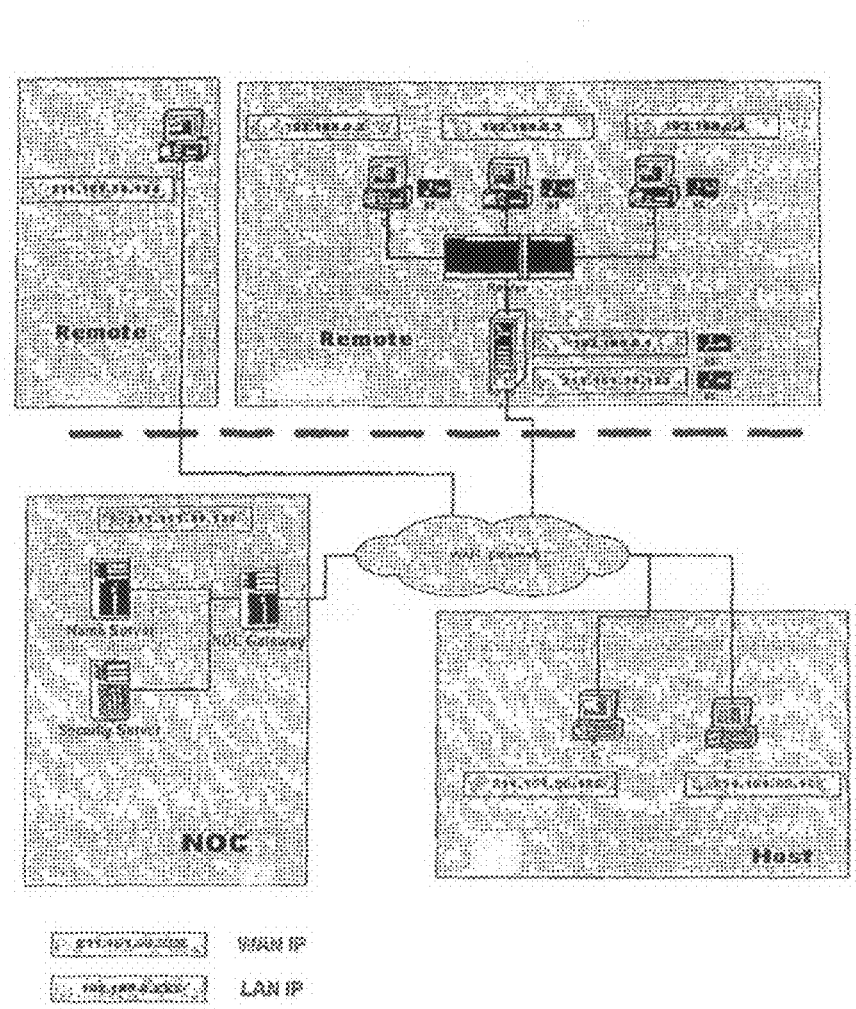
FIG. 23 illustrates an external back up and remote recovery over a network environment.
Figure 24:
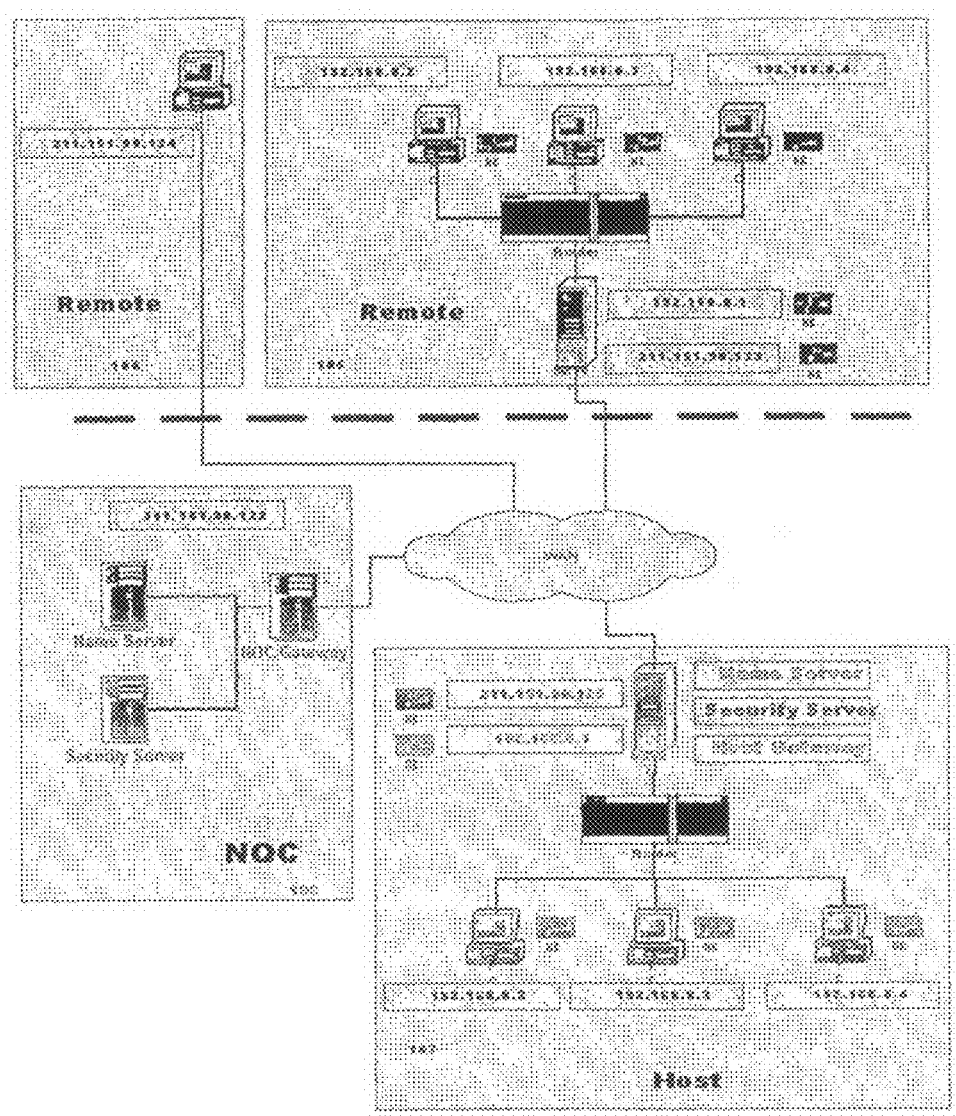
FIG. 24 is an illustration of an external back up and remote recovery over a network environment.

There are two ways a host computer system can be connected to the Internet. The first is a direct connection of the host computer system to the Internet, as shown in FIG. 23. The second is a host computer system within a LAN or the like and which is in turn connected to Internet, as shown in FIG. 24.

FIG. 23 shows the situation where the host computer systems are directly connected to the Internet. The host computer systems are typically individuals or small business users who use dial up modems, or xDSL, to connect to the Internet. In general, the IP address of the host computer systems is dynamic.

Upon being connected to the Internet, the host computer system will send its assigned IP address and remote access policy to the name server and security server, respectively. It is only after the determination of the IP address and access policy of the host computer system that the remote computer system is able to be connected to the host computer system.

It also shows that the remote computer system can be connected to the Internet directly, or within a LAN, to the Internet.

FIG. 24 shows the host computer system within a LAN. As the host computer system does not have a WAN IP address, there is a gateway server in the LAN. The gateway server has a static IP address. Hence, the remote computer system can connect directly to the gateway server to access the name server and security server in the LAN. The gateway server will then establish the connection between the remote computer system and the host computer system.

In the case when a LAN is using a dynamic IP address to access the Internet, the gateway server updates its IP address and access policy with the external name server and security server respectively when it is connected to the Internet. After the remote computer system obtains the IP address and access policy of the host gateway server, it will then connect to the host computer system through the gateway server.

For both FIGS. 23 and 24, a host back up server is configured and Is accessible by all remote computer systems connected to the network. The host back up server is for secondary back up and recovery. The host back up server can be a back up server for host computer systems over the LAN. It can also be a host back up server for remote computer systems over the Internet. Every stand-alone remote computer system will be assigned a second, logical, protected, hidden partition at the host back up server for secondary back up and recovery.

A remote access management routine running on both the stand-alone remote computer systems, and the host computer system, may be used.

The data transfer between the stand-alone remote computer systems, and the host back up server, is preferably secured such as by encryption. Also, the data stored at the secondary protected hidden partition at the host back up server may be protected by encryption. It is preferably only accessible by authorized users.

By the use of a computer diagnostic utility tool together with remote access management routines with security access policy features provided by the FFD, a data isolation technique for host computer systems can be provided to enable remote diagnostic and recovery.

Figure 25:
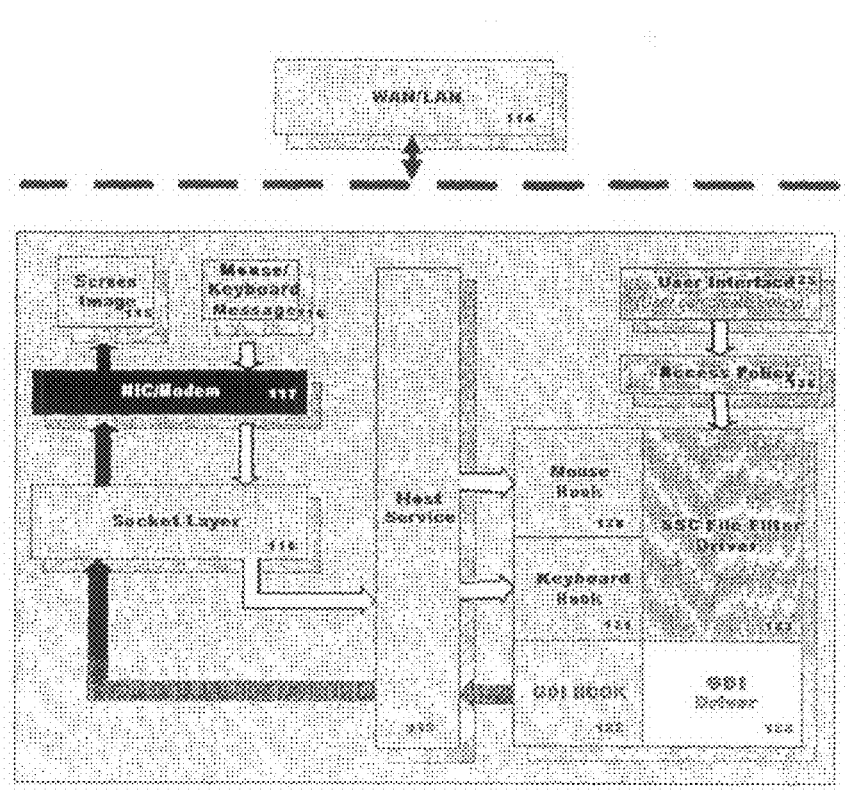
FIG. 25 is an illustration of a first remote access control system.

In FIG. 25, the remote computer system obtains an IP address and a security access right policy of the host computer system from the name and security servers respectively to be able to connect to the host computer system. The request from the remote computer system uses a WAN/LAN to access the host computer system. Through NIC/Modem, socket layer and host services, it becomes a host computer system request. At the same time, the graphics device hook routine of the host computer system will transmit the screen display of the host computer system to the remote computer system for display. A user interface may be provided on the host computer system for the user to configure a security access policy. Under this policy, the FFD will protect the host computer system from file access by the remote computer system.

For security and privacy of the host computer system, the security access policy may include:

1) no right of access to the remote computer system to delete, modify or explore data files of the host computer. For example, all the "Office" document files may be hidden from the remote computer system;
2) to hide the personalized information of the host computer from the remote computer system. For example, email accounts, MSN account, Window user name, and so forth, maybe hidden; and
3) to prevent business document files from access by the remote computer system.

Figure 26:
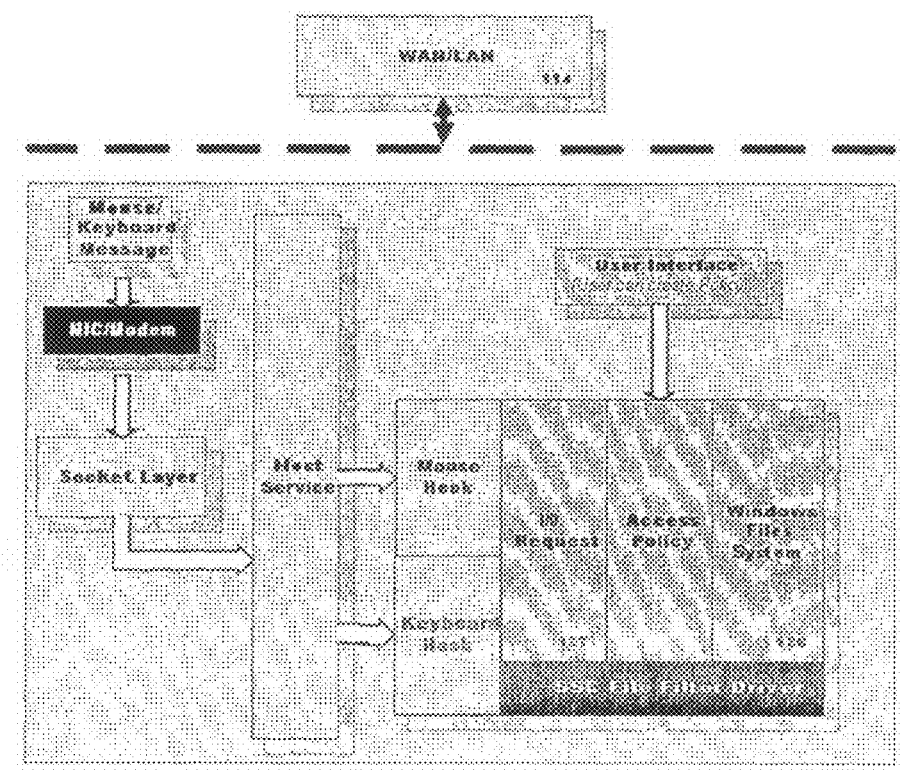
FIG. 26 is an illustration of a second remote access control system.

As shown in FIG. 26, and mentioned earlier, at least four different methods are able to be used to determine the dynamic data files to be isolated for protection. The resultant table is used by the FFD to identify the protected dynamic data files for access, and redirecting of data to the hidden partition, for execution. It also enables the FFD to selectively accept or reject access of files under Isolation for protection. This capability can be used by the host computer system for control of file access by the remote computer system. Furthermore, there are additional methods such as those listed in Tables 9 and 10 that are able to be used for host computer system protection.

(e) Analysis and protection of the system.

(f) Through Analysis and Protection of Software Routine

The FFD is able to analyze the installed software application and assist the host computer system user to determine a software security access policy. As a result, it is able to control the access to, and execution of, the host computer system software application by the remote computer system user. For example, the FFD can reject the execution of instructions to Format, Fdisk, Delete, and so forth invoked by the remote computer system that may damage the host computer system.

With this, and as listed in Table 10, a file security access policy for a host computer system is defined for remote management over the computer network.

TABLE 9

| Type | Definition | Characteristic |
|---|---|---|
| Registry | Critical data to a normal operating system. | To reject or limit the access of host computer system by the remote computer system. |
| User Account Management | The registered user license number and password. | To reject to limit the access of the user account management in the host computer system by the remote computer system so as to prevent any changes or modification. |
| Host security access policy | To determine the security access policy of host computer system. | To reject or limit any modification or changes to the host computer system by the remote computer system so as to prevent any security leakage of the system through Internet. |

These are some of the basic types of system files to be protected from access by the remote computer system. Under different operating systems different system files may be protected.

TABLE 10

| | Operation | Control |
|---|---|---|
| File | Read | Can reject the read operation invoked by remote computer. Only selectively enable read operations of certain file or files to remote computer. |

TABLE 10-continued

| Operation | | Control |
|---|---|---|
| | Write | Can reject the write operation invoked by remote computer. Only selectively enables write operation of certain file or files to remote computer. |
| | Modify | Can reject the modify operation invoked by remote computer. Only selectively enables modify operation of certain file or files to remote computer. |
| | Rename | Can reject the rename operation invoked by remote computer. Only selectively enables rename operation of certain file or files to remote computer. |
| | Move | Can reject the move operation invoked by remote computer. Only selectively enables move operation of certain file or files to remote computer. |
| | Delete | Can reject the delete operation invoked by remote computer. Only selectively enables delete operation of certain file or files to remote computer. |
| | Explorer | Can hide files or directory folders from remote computer. Only selectively exposes certain file, files or directory folders to remote computer. |
| Routine | Run | Can reject the execution of software invoked by remote computer. Only selectively enables execution of certain software with data file to remote computer. |
| | Install | Can reject the installation of software invoked by remote computer. Only selectively enables the installation of software to remote computer. |
| | Uninstall | Can reject the un-installation of software invoked by remote computer. Only selectively enables the un-installation of software to remote computer. |

FIG. 26 shows the building block of the FFD for the control and management of a remote computer system. Before the remote computer system is connected to the host computer system, the host computer system user may need to preset the security access policy as shown in Table 10.

The FFD has three process routines for remote access:
1) the FFD intercepts the request from the remote computer system. For example, the explore, read/write/edit/delete/move/execute instructions;
2) after the FFD intercept of the remote computer system request, the FFD obtains the attribute of the requested data files for access, and checks with the security access policy;
3) the FFD will follow the security access policy and perform one of the following three options:
   (a) reject the request;
   (b) modify the request; and
   (c) pass the request. It will then pass the modified request to the main operating system for completion of the execution.

Some of the guidelines for setting the security access policy may be:
1) to selectively enable the remote computer system to view or execute some of the operating system, and/or selected software application, and/or their configuration and/or data files in the hidden partition; and
2) to selectively enable the remote computer system user to read, modify and write some of the operating system, and/or selected software application, and/or their configuration and/or data files in the hidden partition.

In additional, the following standard host computer system access controls may be provided by the remote access management routine:
1) to enable the authorized remote computer system user to access the host computer system by proper authentication procedures including password control;
2) to protect the software application programs, their configuration and/or data files in the host computer system from the authorized remote user; and
3) to protect and hide the hidden partition of the host computer system from the authorized remote computer user.

In this way privacy for a computer system connected on a network may be enabled to allow remote diagnosis, operation and recovery, if required. This may be by a remote computer system. By use of the hidden partition the computer system user data files in the protected hidden partition are not exposed to the remote operator.

As mentioned earlier, it is possible to restore the operating system with up-to-date dynamic data files even the primary operating system is damaged. This is possible as the recovery system is operated under another operating system. With a built-in communication module, remote access management and security access policy, the recovery system is like the primary operating system. As a result it is possible to provide a secure way for a remote computer system to remotely diagnosis, operate and recover the host computer system using the back up stored in the hidden partition of the host computer system.

The present invention also extends to a computer usable medium comprising a computer program code that is configured to cause a processor to execute one or more functions described above.

Whilst there has been described in the foregoing description preferred embodiments of the present invention, it will be understood by those skilled in the technology that many variations or modifications in details of design, construction, or operation may be made without departing from the present invention.

The present invention extends to all features disclosed both individually, and in all possible permutations and combinations.

The invention claimed is:

1. A data isolation system for software and data maintenance, back up and recovery for a computer wherein dynamic data files are identified and passed into a hidden partition on a hard disk of the computer, and the passing is by one or more of copying and redirection;
   wherein the hidden partition and its content is neither manageable nor accessible by a primary operating system of the computer, and the dynamic data files in the hidden partition are not accessible by any software application on the computer and work as active data files for a software application on the computer and are continuously updated.

2. The system as claimed in claim 1, wherein the passing includes filtering and access control.

3. The system as claimed in claim 1, wherein automatic back ups are made to the dynamic data files in the hidden partition whenever the dynamic data files are accessed and modified.

4. The system as claimed in claim 1, wherein the dynamic data files include the computer's operating environment so that the computer's operating environment can be restored from the dynamic data files in the hidden partition.

5. The system as claimed in claim 1, wherein the dynamic data files in the hidden partition include data up to a time of a failure of the primary operating system.

6. The system as claimed in claim 1, wherein compression is used for the dynamic data files in the hidden partition.

7. The system as claimed in claim 1, wherein encryption is used for the dynamic data files in the hidden partition.

8. The system as claimed in claim 1, wherein:
   prior to copying the dynamic data files into the hidden partition, all software installed on the computer, including the primary operating system, is segregated into at least one static routine and the dynamic data files by categorizing the software installed on the computer;
   the dynamic data files include system configuration files and user data files;
   all data sent from the primary operating system to the dynamic data files and all data sent from the dynamic data files to the primary operating system is passed to the dynamic data files in the hidden partition; and
   the segregating is by one or more of:
   (a) automatic selection of a commonly used software application of the primary operating system;
   (b) automatic selection of a commonly used software application;
   (c) selection of a software application by a user of the computer; and
   (d) selection of files or file folders by the user.

9. The system as claimed in claim 8, wherein
   for (a), (b) and (c), the dynamic data files belonging to the software application are automatically segregated and stored to the hidden partition; and
   for (d), the selected files or the dynamic data files belonging to the selected file folders are automatically segregated and stored to the hidden partition.

10. The system as claimed in claim 1, wherein:
    original dynamic data files in a main partition of the hard disk are continuously updated;
    an additional I/O driver is placed between a file system I/O interface and a disk driver for access control, intercepting, filtering and re-directing data for the dynamic data files in the hidden partition, and the additional I/O driver uses a secondary operating system of the computer;
    the access control, intercepting, filtering and re-directing use regulatory, matching, and fulfillment tables;
    the additional I/O driver is part of one or more of the disk driver, the file system I/O interface, and the primary operating system;
    the secondary operating system is different than the primary operating system; and
    back up and recovery use one of the primary operating system and the secondary operating system.

11. The system as claimed in claim 1, wherein on a system recovery, a last back up of a system environment of the computer in the hidden partition, including the dynamic data files in the hidden partition, is recovered, the dynamic data files in the hidden partition include all user data in the computer up to an instant before the system recovery is invoked, and the system environment includes the primary operating system and the software application.

12. The system as claimed in claim 1, wherein upon new software being installed in the computer, the installation is delayed until a back up of the computer's operating environment to the dynamic data files in the hidden partition is completed and, after completion of the back up, the installation is resumed and, if system instability or failure is encountered after the installation or running of the new software, then the computer restores the computer's operating environment from the back up.

13. The system as claimed in claim 1, wherein upon a new device driver being installed in the computer, the installation is delayed until a back up of the computer's operating environment to the dynamic data files in the hidden partition is completed and, after completion of the back up, the installation is resumed and, if system instability or failure is encountered after the installation or running of the new device driver, then the computer restores the computer's operating environment from the back up.

14. The system as claimed in claim 1, wherein the software application and the dynamic data files belonging to the software application are copied to the hidden partition as independent modules.

15. The system as claimed in claim 1, wherein the dynamic data files in the hidden partition include system configuration files and all user data files in the computer.

16. The system as claimed in claim 1, wherein the dynamic data files stored in the hidden partition are protected.

17. The system as claimed in claim 1, wherein back-up of the dynamic data files in the hidden partition are made in the hidden partition using a first-in-first-out sequence, and upon accessing and modifying the dynamic data files in the hidden partition, the back-ups are updated according to a pre-assigned back-up schedule.

18. The system as claimed in claim 1 further comprising a system for managing access to a host computer by the computer as the computer serves as a remote computer wherein access by the remote computer is in accordance with a software security access policy in the host computer, the dynamic data files are identified and passed into the hidden partition on a hard disk of the host computer, and the passing includes one or more of copying, redirection, filtering, and access control.

19. The system as claimed in claim 1 further comprising a system for providing an external back up for the computer to the hidden partition on a hard disk of a centralized back up server.

20. The system as claimed in claim 19, wherein the hidden partition of the centralized back up server is accessed by the computer using at least one of a LAN, WAN, VPN, Intranet and Internet.

21. A system for managing access to a host computer by a remote computer, wherein:
 access by the remote computer is in accordance with a software security access policy in the host computer;
 dynamic data files are identified and passed into a hidden partition on a hard disk of the host computer, and the passing is by one or more of copying, redirection, filtering, and access control;
 the software security access policy has a file access right and control mechanism that controls access to the host computer by the remote computer; and
 the file access right and control mechanism selectively provides protection to a selected software application and its respective dynamic data files and is controlled by the host computer and includes:
 (a) selection of software application/programs;
 (b) selection of dynamic data files of the software application;
 (c) selection of configuration files;
 (d) selection of a data file or folder; and
 (e) selection of a type of an operation to be performed by the remote computer.

22. The system as claimed in claim 21, wherein the hidden partition and its content is neither manageable nor accessible by an operating system of the remote computer, and the dynamic data files in the hidden partition are not accessible by any software application on the remote computer and work as active data files for the software application on the remote computer and are continuously updated.

23. The system as claimed in claim 21, wherein the selected data file, or data files belonging to the selected folder, are automatically given the access right while any other data files are denied the access right, the file access right and control mechanism is pre-determined by a category of the remote computer, different remote computers are given different access rights for different usage, and files including program, configuration and user data files on the remote computer are automatically given the access right while all other files are denied the access right.

24. The system as claimed in claim 23, wherein:
 the host computer includes a primary operating system, a secondary operating system, a file system I/O interface, a disk driver and an additional I/O driver placed between the file system I/O interface and the disk driver for access control, intercepting, filtering and re-directing data for the dynamic data files;
 the additional I/O driver uses the secondary operating system;
 the access control, intercepting, filtering and re-directing use regulatory, matching, and fulfillment tables; and
 the additional I/O driver is part of one or more of the disk driver, the file system I/O interface, and the primary operating system.

25. The system as claimed in claim 24, wherein the secondary operating system is different than the primary operating system, back up and recovery use one of the primary operating system and the secondary operating system, and the remote access is through the secondary operating system.

26. The system as claimed in claim 21, wherein the selected software application and its respective dynamic data files are identified and are located in at least one partition of a primary operating system of the host computer.

27. The system as claimed in claim 21, wherein the host computer uses diagnostic utilities to allow remote technical support by the remote computer.

28. A system for providing an external back up for a computer to a hidden partition of a centralized back up server, wherein:
 dynamic data files of the computer are identified and passed into the hidden partition on a hard disk of the centralized back up server, and the passing is by one or more of copying and redirection;
 the hidden partition of the centralized back up server is accessed by the computer using at least one of a LAN, WAN, VPN, Intranet and Internet;
 critical software applications and their dynamic data files are stored and protected in the hidden partition of the centralized back up server using encryption and are only able to be accessed by authorized users;
 the computer has an additional I/O driver placed between a file system I/O interface and a disk driver for access control, intercepting, filtering and re-directing data for the dynamic data files;
 the additional I/O driver uses a secondary operating system of the computer;
 the access control, intercepting, filtering and re-directing use regulatory, matching, and fulfillment tables; and
 the additional I/O driver is part of one or more of the disk driver, the file system I/O interface, and a primary operating system of the computer.

29. The system as claimed in claim 28, wherein the hidden partition and its content is neither manageable nor accessible by the primary operating system, and the dynamic data files in the hidden partition are not accessible by any software application on the computer and work as active data files for a software application on the computer and are continuously updated.

30. The system as claimed in claim 29, wherein the dynamic data files include system configuration files and all user data files in the computer.

31. The system as claimed in claim 28, wherein the secondary operating system is different than the primary operating system, and back up and recovery for the computer use one of the primary operating system and the secondary operating system.

32. The system as claimed in claim 28, wherein communication between the computer and the centralized back up server is through the secondary operating system.

33. A data isolation system for software and data maintenance, back up and recovery for a computer wherein dynamic data files are identified and passed into a hidden partition on a hard disk of the computer, and the passing is by one or more of copying and redirection, wherein:
 the hidden partition and its content is neither manageable nor accessible by a primary operating system of the computer;
 the dynamic data files in the hidden partition are not accessible by any software application on the computer and are continuously updated;
 original dynamic data files in a main partition of the hard disk are continuously updated;
 an additional I/O driver is placed between a file system I/O interface and a disk driver for access control, intercepting, filtering and re-directing data for the dynamic data files in the hidden partition, and the additional I/O driver uses a secondary operating system of the computer;
 the access control, intercepting, filtering and re-directing use regulatory, matching, and fulfillment tables;

the additional I/O driver is part of one or more of the disk driver, the file system I/O interface, and the primary operating system;

the secondary operating system is different than the primary operating system; and back up and recovery use one of the primary operating system and the secondary operating system.

34. The system as claimed in claim 33, wherein the primary operating system interacts with a user of the computer, and the secondary operating system is transparent to the user.

35. The system as claimed in claim 34, wherein the back up and recovery use the secondary operating system.

36. A data isolation system for software and data maintenance, back up and recovery for a computer wherein dynamic data files are identified and passed into a hidden partition on a hard disk of the computer, and the passing is by one or more of copying and redirection, wherein:

the hidden partition and its content is neither manageable nor accessible by a primary operating system of the computer;

the dynamic data files in the hidden partition are not accessible by any software application on the computer; and on a system recovery, a last back up of a system environment of the computer in the hidden partition, including the dynamic data files in the hidden partition, is recovered, the dynamic data files in the hidden partition include all user data in the computer up to an instant before the system recovery is invoked, and the system environment includes the primary operating system and the software application.

37. A data isolation system for software and data maintenance, back up and recovery for a computer wherein dynamic data files are identified and passed into a hidden partition on a hard disk of the computer, and the passing is by one or more of copying and redirection, wherein:

the hidden partition and its content is neither manageable nor accessible by a primary operating system of the computer;

the dynamic data files in the hidden partition are not accessible by any software application on the computer and work as active data files and are continuously updated; and back-ups of the dynamic data files in the hidden partition are made in the hidden partition using a first-in-first-out sequence, and upon accessing and modifying the dynamic data files in the hidden partition, the back-ups are updated according to a pre-assigned back-up schedule.

38. A computer, comprising:

a primary operating system that interacts with a user of the computer;

a secondary operating system that is different than the primary operating system;

a hard disk that includes a hidden partition; and a data isolation system that identifies dynamic data files and passes the dynamic data files to the hidden partition, wherein the dynamic data files include system configuration files and user data files, the passing includes one or more of copying and redirection, the hidden partition and its content cannot be managed and cannot be accessed by the primary operating system, the user and any software application on the computer, and the hidden partition and its content is managed and accessed by the secondary operating system for software and data maintenance, back up and recovery for the computer.

39. The system as claimed in claim 38, wherein the primary operating system is a Windows operating system and the secondary operating system is a Linux operating system.

40. The system as claimed in claim 38, wherein the secondary operating system is transparent to the user.

41. The system as claimed in claim 38, wherein the secondary operating system is placed between the primary operating system and the dynamic data files in the hidden partition.

42. The system as claimed in claim 41, wherein the secondary operating system passes all user data in the computer from the primary operating system to the dynamic data files in the hidden partition.

43. The system as claimed in claim 41, wherein the primary operating system includes a file system I/O interface, a disk driver and an additional I/O driver, and the additional I/O driver is placed between the file system I/O interface and the disk driver and transfers data to and from the dynamic data files in the hidden partition using the secondary operating system.

44. The system as claimed in claim 41, wherein the additional I/O driver provides access control, intercepting, filtering and re-directing of the data for the dynamic data files in the hidden partition using the secondary operating system.

45. The system as claimed in claim 44, wherein the additional I/O driver provides the access control, intercepting, filtering and re-directing of the data for the dynamic data files in the hidden partition using regulatory, matching, and fulfillment tables.

46. The system as claimed in claim 38, wherein the dynamic data files in the hidden partition work as active data files for a software application on the computer and are continuously updated whenever the dynamic data files are accessed and modified.

47. The system as claimed in claim 38, wherein the dynamic data files in the hidden partition are automatically backed up in a circular first-in-first-out sequence in the hidden partition whenever the dynamic data files are accessed and modified.

48. A computer, comprising:

a primary operating system that interacts with a user of the computer;

a secondary operating system that is different than the primary operating system and is transparent to the user;

a hard disk that includes a hidden partition; and a data isolation system that identifies dynamic data files and passes the dynamic data files to the hidden partition, wherein the dynamic data files include the computer's operating environment and user data files, the passing includes one or more of copying and redirection, the hidden partition and its content cannot be managed and cannot be accessed by the primary operating system, the user and any software application on the computer, the hidden partition and its content is managed and accessed by the secondary operating system for software and data maintenance, back up and recovery for the computer, and the secondary operating system is placed between the primary operating system and the dynamic data files in the hidden partition and passes all user data in the computer from the primary operating system to the dynamic data files in the hidden partition.

49. The system as claimed in claim 48, wherein the primary operating system is a Windows operating system and the secondary operating system is a Linux operating system.

50. The system as claimed in claim 48, wherein the primary operating system includes a file system I/O interface, a disk driver and an additional I/O driver, the additional I/O driver is placed between the file system I/O interface and the disk driver and transfers data to and from the dynamic data files in the hidden partition using the secondary operating system, and the additional I/O driver provides access control, intercepting, filtering and re-directing of the data for the dynamic data files in the hidden partition using the secondary operating system and regulatory, matching, and fulfillment tables.

51. The system as claimed in claim 48, wherein the dynamic data files in the hidden partition work as active data files for a software application on the computer and are continuously updated whenever the dynamic data files are accessed and modified.

52. The system as claimed in claim 48, wherein the dynamic data files in the hidden partition are automatically backed up in a circular first-in-first-out sequence in the hidden partition whenever the dynamic data files are accessed and modified.

* * * * *